US007230058B2

(12) United States Patent
Miyaki et al.

(10) Patent No.: US 7,230,058 B2
(45) Date of Patent: *Jun. 12, 2007

(54) RING-OPENED POLYNORBORNENES

(75) Inventors: Nobuyuki Miyaki, Tokyo (JP);
Yoshikazu Miyamoto, Tokyo (JP);
Souichi Yoshida, Tokyo (JP); Yuichi Hashiguchi, Tokyo (JP)

(73) Assignee: JSR Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/362,086

(22) Filed: Feb. 27, 2006

(65) Prior Publication Data

US 2006/0189771 A1 Aug. 24, 2006

Related U.S. Application Data

(62) Division of application No. 10/534,003, filed as application No. PCT/JP03/14375 on Nov. 12, 2003.

(30) Foreign Application Priority Data

Nov. 14, 2002 (JP) ............................. 2002-331040

(51) Int. Cl.
*C08G 61/08* (2006.01)
*C08F 8/04* (2006.01)

(52) U.S. Cl. .................. 526/259; 525/326.8; 525/338; 525/940

(58) Field of Classification Search ................ 526/262, 526/279, 281, 282, 259; 525/326.8, 338, 525/940
See application file for complete search history.

(56) References Cited

U.S. PATENT DOCUMENTS

| | | | |
|---|---|---|---|
| 3,959,234 A | | 5/1976 | Kurosawa et al. |
| 3,991,139 A | | 11/1976 | Kokuryo et al. |
| 4,250,063 A | | 2/1981 | Kotani et al. |
| 4,614,778 A | | 9/1986 | Kajiura et al. |
| 5,053,471 A | | 10/1991 | Goto et al. |
| 5,061,771 A | | 10/1991 | Oshima et al. |
| 5,115,037 A | * | 5/1992 | Asrar .................. 525/326.8 |
| 5,200,470 A | * | 4/1993 | Asrar .................. 525/326.8 |
| 5,543,948 A | | 8/1996 | Takahashi et al. |
| 6,552,145 B1 | | 4/2003 | Okada et al. |
| 6,846,890 B2 | | 1/2005 | Miyaki et al. |
| 2004/0047056 A1 | | 3/2004 | Sekiguchi et al. |
| 2004/0057141 A1 | | 3/2004 | Sekiguchi et al. |
| 2004/0242823 A1 | | 12/2004 | Sekiguchi et al. |

FOREIGN PATENT DOCUMENTS

| | | |
|---|---|---|
| EP | 0 263 425 A1 | 4/1988 |
| EP | 0 297 078 A2 | 12/1988 |
| EP | 0 491 672 A2 | 6/1992 |
| JP | 50-52197 | 5/1975 |
| JP | 52-126500 | 10/1977 |
| JP | 05-212828 | 8/1983 |
| JP | 61-77673 | 4/1986 |
| JP | 61-115912 | 6/1986 |
| JP | 61-120816 | 6/1986 |
| JP | 63-218726 | 9/1988 |
| JP | 01-132625 | 5/1989 |
| JP | 01-132626 | 5/1989 |
| JP | 01-240517 | 9/1989 |
| JP | 02-133413 | 5/1990 |
| JP | 04-245202 | 9/1992 |
| JP | 05-061026 | 3/1993 |
| JP | 05-064865 | 3/1993 |
| JP | 06-051117 | 2/1994 |
| JP | 07-077608 | 3/1995 |
| WO | WO 99/42502 | 8/1999 |

OTHER PUBLICATIONS

Olefin Metathesis and Metathesis Polymerization (K. J. Ivin, J. C. Mol, Academic Press, 1997, pp. 12-49).

P. M. Blackmore, et al., "Stereoregular Fluoropolymers: 6. The Ring-Opening Polymerization of N-Pentafluorophenylbicyclo (2.2.1) Hept-5-Ene-2, 3-Dicarboximide", Journal of Fluorine Chemistry, vol. 40, XP-002379968, 1988, pp. 331-347.

* cited by examiner

*Primary Examiner*—Fred Teskin
(74) *Attorney, Agent, or Firm*—Oblon, Spivak, McClelland, Maier & Neustadt, P.C.

(57) ABSTRACT

The disclosure is directed to a partially hydrogenated ring-opened polynorbornene and a process for making the same. The ring-opened polynorbornene is low in birefringence, high in wavelength dependency about birefringence and excellent in transparency and heat resistance.

12 Claims, 13 Drawing Sheets

RING-OPENED POLYNORBORNENES

TECHNICAL FIELD

The present invention relates to a ring-opened norbornene polymer, and particularly to a ring-opened norbornene polymer small in birefringence, high in wavelength dependency about birefringence and excellent in transparency and heat resistance.

BACKGROUND ART

Transparent resins have heretofore been used as ordinary materials for automobile parts, lighting equipments, electric parts, etc., of which transparency is required, and have recently been being applied to, particularly, optical materials that optical properties are of great importance. Polycarbonate resins and acrylic resins are known as transparent resins suitably used for such application fields.

However, the acrylic resins involve problems in points of heat resistance and water resistance (low water absorption property) and the like though they are excellent in transparency. On the other hand, the polycarbonate resins involve such problems that birefringence is great though they are superb in heat resistance and water resistance to the acrylic resins. Therefore, as transparent resins for optical materials, attention has been recently attracted to cycloolefin resins that have good transparency, water resistance, low birefringence, heat resistance and the like in combination and is supplied to actual use.

As such cycloolefin reins, various resins have been known and described in, for example, Patent Literature 1 to Patent Literature 6.

With the high advancement of function and use of optical instrument, however, these cycloolefin resins may not sufficiently satisfy properties required of optical materials in some cases. In optical materials used in optical instrument having highly advanced functions in particular, sufficiently low birefringence is extremely important property. There is thus a demand for development of a transparent resin having far excellent low birefringence compared with the conventional transparent resins.

On the other hand, attention is attracted to cycloolefin resins as resin materials used in optical films. Films formed of such a cycloolefin resin have been proposed as various optical films.

Specifically, phase difference plates formed of a film of a cycloolefin resin are described in Patent Literature 7 to Patent Literature 10.

In Patent Literature 11 to Patent Literature 13, it is described that a film of a cycloolefin resin is used as a protective film for a polarizing plate.

A substrate for a liquid crystal display device, which is composed of a film of a cycloolefin resin, is described in Patent Literature 14.

Since the optical films formed respectively of these cycloolefin reins have property that the absolute value of phase difference (birefringence) of transmitted light becomes smaller as the wavelength of the transmitted light becomes longer, however, it is extremely difficult to give a specific phase difference of, for example, a ¼ wavelength to the transmitted light of all rays in a apply to optical films formed respectively of other resins in addition to the conventional cycloolefin resins.

As described above, in resins used in application fields of which highly-advanced optical properties are required, the control of specific wavelength dependency about birefringence that the birefringence of transmitted light becomes greater as the wavelength of the transmitted light becomes longer when a film is formed, and degree of the birefringence become great problems.

Prior Art 1: Japanese Patent Application Laid-Open No. 132625/1989;
Prior Art 2: Japanese Patent Application Laid-Open No. 132626/1989;
Prior Art 3: Japanese Patent Application Laid-Open No. 133413/1990;
Prior Art 4: Japanese Patent Application Laid-Open No. 120816/1986;
Prior Art 5: Japanese Patent Application Laid-Open No. 115912/1986;
Prior Art 6: Japanese Patent Application Laid-Open No. 218726/1988;
Prior Art 7: Japanese Patent Application Laid-Open No. 245202/1992;
Prior Art 8: Japanese Patent Application Laid-Open No. 36120/1992;
Prior Art 9: Japanese Patent Application Laid-Open No. 2108/1993;
Prior Art 10: Japanese Patent Application Laid-Open No. 64865/1993;
Prior Art 11: Japanese Patent Application Laid-Open No. 212828/1993;
Prior Art 12: Japanese Patent Application Laid-Open No. 51117/1994;
Prior Art 13: Japanese Patent Application Laid-Open No. 77608/1995;
Prior Art 14: Japanese Patent Application Laid-Open No. 61026/1993;

DISCLOSURE OF THE INVENTION

The present invention has been made on the basis of the foregoing circumstances and has as its object the provision of a ring-opened norbornene polymer that is relatively small in birefringence, has specific wavelength dependency about birefringence and is excellent in transparency and heat resistance.

According to the present invention, there is thus provided a ring-opened norbornene polymer comprising a structural unit (I) represented by the following general formula (I):

[Chemical formula 1]

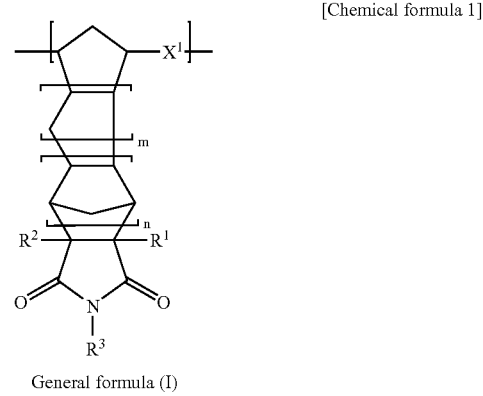

General formula (I)

wherein in the general formula (I), m and n are, independently of each other, an integer of 0 to 2, $X^1$ means an ethylene or vinylene group, $R^1$ and $R^2$ denote, independently of each other, a hydrogen atom or a substituted or unsubstituted hydrocarbon group having 1 to 30 carbon atoms, and $R^3$ represents a group represented by the following general formula (I-1) or a group represented by the following general formula (I-2):

[Chemical formula 2]

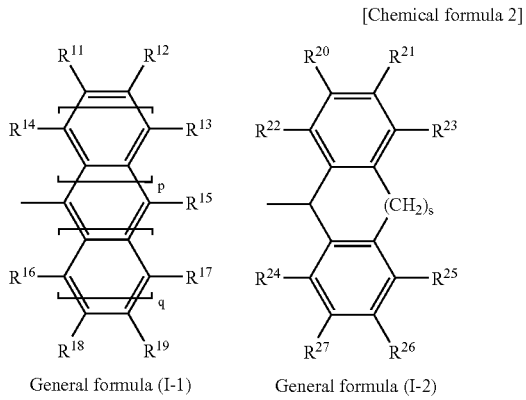

General formula (I-1)   General formula (I-2)

wherein in the general formulae (I-1) and (I-2), $R^{11}$ to $R^{27}$ denote, independently of one another, a hydrogen atom; a halogen atom; a substituted or unsubstituted hydrocarbon group having 1 to 30 carbon atoms, which may have a linkage containing or not containing oxygen, sulfur, nitrogen and/or silicon atom(s); or a polar group, p and q in the general formula (I-1) are individually 0 or a positive integer, with the proviso that when both p and q are 0, $R^{12}$ and $R^{15}$, or $R^{19}$ and $R^{15}$ may be bonded to each other to form a carbon ring or heterocyclic ring, and the carbon ring or heterocyclic ring may be either a monocyclic structure or a polycyclic structure, and s in the general formula (I-2) is 0 or an integer of 1 or greater.

The ring-opened norbornene polymer according to the present invention may be a polymer comprising a structural unit represented by the following general formula (II).

In such a ring-opened norbornene polymer, the proportion of the structural unit (II) may preferably be at most 98 mol % based on the whole structural unit.

[Chemical formula 3]

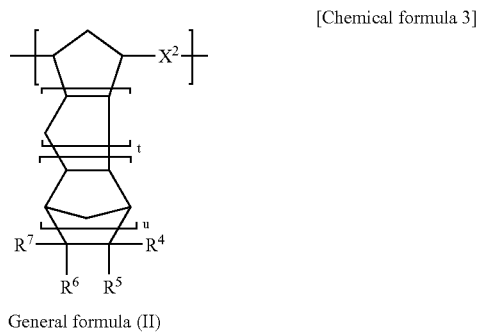

General formula (II)

wherein in the general formula (II), t and u are, independently of each other, 0 or a positive integer, $X^2$ means an ethylene or vinylene group, $R^4$ to $R^7$ denote, independently of one another, a hydrogen atom; a halogen atom; a substituted or unsubstituted hydrocarbon group having 1 to 30 carbon atoms, which may have a linkage containing or not containing oxygen, sulfur, nitrogen and/or silicon atom(s); or a polar group, with the proviso that $R^4$ and $R^5$, or $R^6$ and $R^7$ may be united with each other to form a divalent hydrocarbon group, $R^4$ or $R^5$, and $R^6$ or $R^7$ may be bonded to each other to form a carbon ring or heterocyclic ring, and the carbon ring or heterocyclic ring may be either a monocyclic structure or a polycyclic structure.

In the ring-opened norbornene polymers according to the present invention, at least 90 mol % of $X^1$ in the general formula (I) and $X^2$ in the general formula (II) may be preferably ethylene groups.

The ring-opened norbornene polymer may preferably have a structural unit (I) that in the general formula (I), m is 0, and n is 1.

The ring-opened norbornene polymer may also preferably have a structural unit (I) that in the general formula (I-1), p is 0, q is 0, and at least one of $R^{11}$ and $R^{18}$ is another substituent group than hydrogen.

The ring-opened norbornene polymer may further preferably have a structural unit (I) that in the general formula (I-1), p is 0, q is 0, at least, one of $R^{11}$ and $R^{18}$ has another substituent group than hydrogen, and at least one of $R^{12}$, $R^{15}$ and $R^{19}$ is another substituent group than hydrogen.

The ring-opened norbornene polymer may still further preferably have a structural unit (I) that in the general formula (I-1), p is 0, q is 0, and both $R^{11}$ and $R^{18}$ are other substituent groups than hydrogen.

EFFECTS OF THE INVENTION

Since the ring-opened norbornene polymers according to the present invention exhibit specific wavelength dependency about birefringence and have low birefringence and high heat resistance and transparency, they are useful in fields of optical parts, electric and electronic materials, and the like. Specifically, they are useful as disks, magneto-optical disks, optical lenses (FΘ lenses, pickup lenses, lenses for laser printers, lenses for cameras, etc.), spectacle lenses, optical films (films for display, phase difference films, polarizing films, transparent conductive films, wave plates, optical pickup films, etc.), liquid crystal orientation films, optical sheets, optical fibers, light guide plates, light-diffusing plates, optical cards, optical mirrors, and sealing materials for semiconductors such as IC, LSI and LED.

BEST MODE FOR CARRYING OUT THE INVENTION

Figure 1:
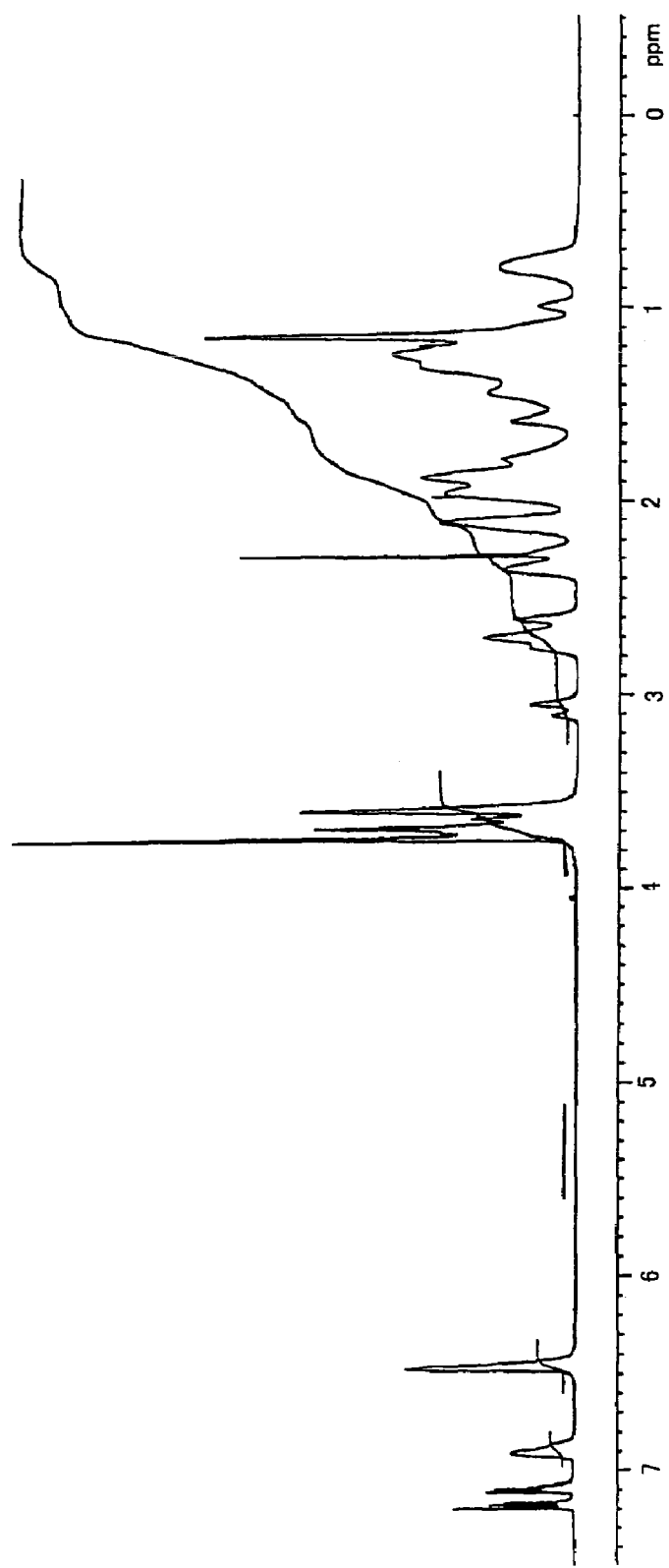
FIG. 1 illustrates a $^1$H-NMR spectrum of Polymer (P1) according to Example 1.

The ring-opened norbornene polymers according to the present invention will hereinafter be described in details.

The ring-opened norbornene polymer according to the present invention comprises the structural unit (I) represented by the general formula (I).

In the general formula (I), m and n are, independently of each other, an integer of 0 to 2, and $X^1$ is an ethylene or vinylene group.

$R^1$ and $R^2$ denote, independently of each other, a hydrogen atom or a substituted or unsubstituted hydrocarbon group having 1 to 30 carbon atoms, preferably 1 to 10 carbon atoms. Specific examples of the hydrocarbon group include alkyl groups such as methyl, ethyl and propyl groups; cycloalkyl groups such as cyclopentyl and cyclohexyl groups; alkenyl groups such as vinyl and allyl groups; alkylidene groups such as ethylidene and propylidene groups; aromatic groups such as a phenyl group; and groups with a part or the whole of hydrogen atoms of these groups substituted by a halogen atom such as fluorine, chlorine or bromine, a phenylsulfonyl group, or the like.

$R^3$ is a group represented by the above general formula (I-1) or a group represented by the above general formula (I-2).

In the general formulae (I-1) and (I-2), $R^{11}$ to $R^{27}$ are, independently of one another, a hydrogen atom; a halogen atom; a substituted or unsubstituted hydrocarbon group having 1 to 30 carbon atoms, preferably 1 to 20 carbon atoms, which may have a linkage containing or not containing oxygen, sulfur, nitrogen and/or silicon atom(s); or a polar group.

Specific examples of the halogen atom include fluorine, chlorine and bromine atoms.

Specific examples of the substituted or unsubstituted hydrocarbon group having 1 to 30 carbon atoms include the same groups as those exemplified as $R^1$ and $R^2$ in the general formula (I). These hydrocarbon groups may be directly bonded to the carbon atom of the aromatic ring or may be bonded through a linkage. In this description, the linkage is a group containing or not containing oxygen, sulfur, nitrogen and/or silicon atom(s). Specific examples thereof include divalent hydrocarbon groups [for example, alkylene groups represented by —$(CH_2)_m$—, in which m is an integer of 1 to 10] having 1 to 10 carbon atoms, a carbonyl group (—CO—), a carbonyloxy group (—COO—), a sulfone group (—$SO_2$—), an ether linkage (—O—), a thioether linkage (—S—), an imino group (—NH—), an amide linkage (—NHCO—), siloxane linkages (—$Si(R_2)O$—, in which R is an alkyl group such as a methyl or ethyl group), and combinations of 2 or more of these groups.

Examples of the polar group include hydroxyl groups, alkoxy groups having 1 to 10 carbon atoms, ester groups, alkoxycarbonyl groups, aryloxycarbonyl groups, a cyano group, an amide group, an imide group, triorganosiloxy groups, triorganosilyl groups, amino groups, an acyl group, alkoxysilyl groups, a sulfonyl group and a carboxyl group. More specifically, examples of the alkoxy groups include methoxy and ethoxy groups; examples of the ester groups include fatty acid ester groups such as acetate and propionate groups, and aromatic ester groups such as a benzoate group; examples of the alkoxycarbonyl groups include methoxycarbonyl and ethoxycarbonyl groups; examples of the aryloxycarbonyl groups include phenoxycarbonyl and naphthyloxycarbonyl, fluorenyloxycarbonyl and biphenyloxycarbonyl groups; examples of the triorganosiloxy groups include trimethylsiloxy and triethylsiloxy groups; examples of the triorganosilyl groups include trimethylsilyl and triethylsilyl groups; examples of the amino groups include a primary amino group; and examples of the alkoxysilyl groups include trimethoxysilyl and triethoxysilyl groups.

In the general formula (I-1), p and q are individually 0 or a positive integer, preferably 0, 1 or 2. In the general formula (I-2), s is 0 or a positive integer, preferably 0, 1 or 2.

When both p and q in the general formula (I-1) are 0, $R^{12}$ and $R^{15}$, or $R^{19}$ and $R^{15}$ may be bonded to each other to form a carbon ring or heterocyclic ring, and the carbon ring or heterocyclic ring may be either a monocyclic structure or a polycyclic structure. Specific examples of such ring structures include those shown in the following formulae (i) to (iii):

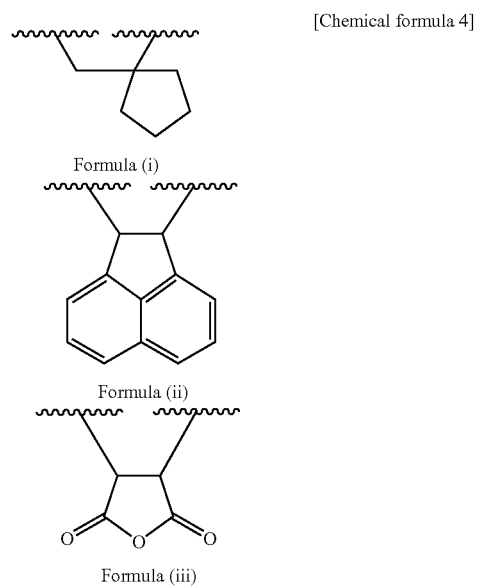

[Chemical formula 4]

Formula (i)

Formula (ii)

Formula (iii)

As such a structural unit (I), are preferred those, in which in the general formula (I), m is 0, n is 1, both $R^1$ and $R^2$ are hydrogen atoms, and $R^3$ is a group represented by the general formula (I-1) or the general formula (I-2), in that a ring-opened norbornene polymer high in heat resistance and low in water absorption property is obtained. Among these, those, in which both p and q in the general formula (I-1) are 0, or s in the general formula (I-2) is 0, are more preferred, with those, in which $R^3$ is a group represented by the general formula (I-1), both p and q in the general formula (I-1) are 0, and at least one of $R^{11}$ and $R^{18}$ is another substituent group than hydrogen, being particularly preferred. Further, those, in which $R^3$ is a group represented by the general formula (I-1), both p and q in the general formula (I-1) are 0, at least one of $R^{11}$ and $R^{18}$ has another substituent group than hydrogen, and at least one of $R^{12}$, $R^{15}$ and $R^{19}$ is another substituent group than hydrogen, or in which both $R^{11}$ and $R^{18}$ are other substituent groups than hydrogen, being particularly preferred.

Such a structural unit (I) is obtained by subjecting a norbornene monomer (hereinafter referred to as "Specific Monomer (I)") represented by the following general formula (Im) to ring-opening polymerization.

[Chemical formula 5]

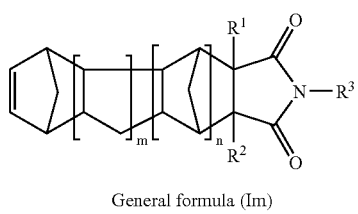

General formula (Im)

As such Specific Monomer (I), may be used an imide compound obtained by, for example, a reaction of a norbornenic acid anhydride such as 4-oxa-tricyclo-[5.2.1.0$^{2,6}$]dec-8-ene-3,5-dione or 6-oxa-pentacyclo-[9.2.1.1$^{3,9}$.0$^{2,10}$.0$^{4,8}$]pentadec-12-ene-5,7-dione with an aromatic amine. Specific examples thereof include (1) 4-phenyl-4-aza-tricyclo[5.2.1.0$^{2,6}$]dec-8-ene-3,5-dione,
(2) 6-phenyl-6-aza-pentacyclo[9.2.1.1$^{3,9}$.0$^{2,10}$.0$^{4,8}$]pentadec-12-ene-5,7-dione,
(3) 4-(2-methylphenyl)-4-aza-tricyclo[5.2.1.0$^{2,6}$]dec-8-ene-3,5-dione,
(4) 6-(2-methylphenyl)-6-aza-pentacyclo-[9.2.1.1$^{3,9}$.0$^{2,10}$.0$^{4,8}$]pentadec-12-ene-5,7-dione,
(5) 4-(2,6-dimethylphenyl)-4-aza-tricyclo[5.2.1.0$^{2,6}$]dec-8-ene-3,5-dione,
(6) 6-(2,6-dimethylphenyl)-6-aza-pentacyclo-[9.2.1.1$^{3,9}$.0$^{2,10}$.0$^{4,8}$]pentadec-12-ene-5,7-dione,
(7) 4-(2,6-diethylphenyl)-4-aza-tricyclo[5.2.1.0$^{2,6}$]dec-8-ene-3,5-dione,
(8) 6-(2,6-diethylphenyl)-6-aza-pentacyclo-[9.2.1.1$^{3,9}$.0$^{2,10}$.0$^{4,8}$]pentadec-12-ene-5,7-dione,
(9) 4-(2,4-dimethylphenyl)-4-aza-tricyclo[5.2.1.0$^{2,6}$]dec-8-ene-3,5-dione,
(10) 6-(2,4-dimethylphenyl)-6-aza-pentacyclo-[9.2.1.1$^{3,9}$.0$^{2,10}$.0$^{4,8}$]pentadec-12-ene-5,7-dione,
(11) 4-(4-chloro-2-methylphenyl)-4-aza-tricyclo[5.2.1.0$^{2,6}$]dec-8-ene-3,5-dione,
(12) 6-(4-chloro-2-methylphenyl)-6-aza-pentacyclo[9.2.1.1$^{3,9}$.0$^{2,10}$.0$^{4,8}$]pentadec-12-ene-5,7-dione,
(13) 4-(4-chlorophenyl)-4-aza-tricyclo[5.2.1.0$^{2,6}$]dec-8-ene-3,5-dione,
(14) 6-(4-chlorophenyl)-6-aza-pentacyclo[9.2.1.1$^{3,9}$.0$^{2,10}$.0$^{4,8}$]pentadec-12-ene-5,7-dione,
(15) 4-(2-chlorophenyl)-4-aza-tricyclo[5.2.1.0$^{2,6}$]dec-8-ene-3,5-dione,
(16) 6-(2-chlorophenyl)-6-aza-pentacyclo[9.2.1.1$^{3,9}$.0$^{2,10}$.0$^{4,8}$]pentadec-12-ene-5,7-dione,
(17) 4-(3-chlorophenyl)-4-aza-tricyclo[5.2.1.0$^{2,6}$]dec-8-ene-3,5-dione,
(18) 6-(3-chlorophenyl)-6-aza-pentacyclo[9.2.1.1$^{3,9}$.0$^{2,10}$.0$^{4,8}$]pentadec-12-ene-5,7-dione,
(19) 4-(2,5-dichlorophenyl)-4-aza-tricyclo[5.2.1.0$^{2,6}$]dec-8-ene-3,5-dione,
(20) 6-(2,5-dichlorophenyl)-6-aza-pentacyclo[9.2.1.1$^{3,9}$.0$^{2,10}$.0$^{4,8}$]pentadec-12-ene-5,7-dione,
(21) 4-(2,4-dichlorophenyl)-4-aza-tricyclo[5.2.1.0$^{2,6}$]dec-8-ene-3,5-dione,
(22) 6-(2,4-dichlorophenyl)-6-aza-pentacyclo[9.2.1.1$^{3,9}$.0$^{2,10}$.0$^{4,8}$]pentadec-12-ene-5,7-dione,
(23) 4-(2,6-dichlorophenyl)-4-aza-tricyclo[5.2.1.0$^{2,6}$]dec-8-ene-3,5-dione,
(24) 6-(2,6-dichlorophenyl)-6-aza-pentacyclo[9.2.1.1$^{3,9}$.0$^{2,10}$.0$^{4,8}$]pentadec-12-ene-5,7-dione,
(25) 4-(2,4,5-trichlorophenyl)-4-aza-tricyclo[5.2.1.0$^{2,6}$]dec-8-ene-3,5-dione,
(26) 6-(2,4,5-trichlorophenyl)-6-aza-pentacyclo[9.2.1.1$^{3,9}$.0$^{2,10}$.0$^{4,8}$]pentadec-12-ene-5,7-dione,
(27) 4-(4-bromophenyl)-4-aza-tricyclo[5.2.1.0$^{2,6}$]dec-8-ene-3,5-dione,
(28) 6-(4-bromophenyl)-6-aza-pentacyclo[9.2.1.1$^{3,9}$.0$^{2,10}$.0$^{4,8}$]pentadec-12-ene-5,7-dione,
(29) 4-(4-bromo-2,6-dimethylphenyl)-4-aza-tricyclo[5.2.1.0$^{2,6}$]dec-8-ene-3,5-dione,
(30) 6-(4-bromo-2,6-dimethylphenyl)-6-aza-pentacyclo-[9.2.1.1$^{3,9}$.0$^{2,10}$.0$^{4,8}$]pentadec-12-ene-5,7-dione,
(31) 4-(4-ethoxycarbonylphenyl)-4-aza-tricyclo[5.2.1.0$^{2,6}$]dec-8-ene-3,5-dione,
(32) 6-(4-ethoxycarbonylphenyl)-6-aza-pentacyclo[9.2.1.1$^{3,9}$.0$^{2,10}$.0$^{4,8}$]pentadec-12-ene-5,7-dione,
(33) 4-(4-ethoxycarbonyl-2-methylphenyl)-4-aza-tricyclo-[5.2.1.0$^{2,6}$]dec-8-ene-3,5-dione,
(34) 6-(4-ethoxycarbonyl-2-methylphenyl)-6-aza-pentacyclo-[9.2.1.1$^{3,9}$.0$^{2,10}$.0$^{4,8}$]pentadec-12-ene-5,7-dione,
(35) 4-(5-ethoxycarbonyl-2-methylphenyl)-4-aza-tricyclo-[5.2.1.0$^{2,6}$]dec-8-ene-3,5-dione,
(36) 6-(5-ethoxycarbonyl-2-methylphenyl)-6-aza-pentacyclo-[9.2.1.1$^{3,9}$.0$^{2,10}$.0$^{4,8}$]pentadec-12-ene-5,7-dione,
(37) 4-(2-methoxy-5-methoxycarbonylphenyl)-4-aza-tricyclo-[5.2.1.0$^{2,6}$]dec-8-ene-3,5-dione,
(38) 6-(2-methoxy-5-methoxycarbonylphenyl)-6-aza-pentacyclo[9.2.1.1$^{3,9}$.0$^{2,10}$.0$^{4,8}$]pentadec-12-ene-5,7-dione,
(39) 4-(2-chloro-5-dodecyloxycarbonylphenyl)-4-aza-tricyclo-[5.2.1.0$^{2,6}$]dec-8-ene-3,5-dione,
(40) 6-(2-chloro-5-dodecyloxycarbonylphenyl)-6-aza-pentacyclo[9.2.1.1$^{3,9}$.0$^{2,10}$.0$^{4,8}$]pentadec-12-ene-5,7-dione,
(41) 4-(2-ethoxycarbonylphenyl)-4-aza-tricyclo[5.2.1.0$^{2,6}$]dec-8-ene-3,5-dione,
(42) 6-(2-ethoxycarbonylphenyl)-6-aza-pentacyclo-[9.2.1.1$^{3,9}$.0$^{2,10}$.0$^{4,8}$]pentadec-12-ene-5,7-dione,
(43) 4-(2-ethoxycarbonyl-4,5-dimethoxyphenyl)-4-aza-tricyclo[5.2.1.0$^{2,6}$]dec-8-ene-3,5-dione,
(44) 6-(2-ethoxycarbonyl-4,5-dimethoxyphenyl)-6-aza-pentacyclo[9.2.1.1$^{3,9}$.0$^{2,10}$.0$^{4,8}$]pentadec-12-ene-5,7-dione,
(45) 4-(2-methoxyphenyl)-4-aza-tricyclo[5.2.1.0$^{2,6}$]dec-8-ene-3,5-dione,
(46) 6-(2-methoxyphenyl)-6-aza-pentacyclo[9.2.1.1$^{3,9}$.0$^{2,10}$.0$^{4,8}$]pentadec-12-ene-5,7-dione,
(47) 4-(4-methoxyphenyl)-4-aza-tricyclo[5.2.1.0$^{2,6}$]dec-8-ene-3,5-dione,
(48) 6-(4-methoxyphenyl)-6-aza-pentacyclo[9.2.1.1$^{3,9}$.0$^{2,10}$.0$^{4,8}$]pentadec-12-ene-5,7-dione,
(49) 4-(2,4-dimethoxyphenyl)-4-aza-tricyclo[5.2.1.0$^{2,6}$]dec-8-ene-3,5-dione,
(50) 6-(2,4-dimethoxyphenyl)-6-aza-pentacyclo[9.2.1.1$^{3,9}$.0$^{2,10}$.0$^{4,8}$]pentadec-12-ene-5,7-dione,

(51) 4-(3,5-dimethoxycarbonylphenyl)-4-aza-tricyclo[5.2.1.0$^{2,6}$]dec-8-ene-3,5-dione,
(52) 6-(3,5-dimethoxycarbonylphenyl)-6-aza-pentacyclo[9.2.1.1$^{3,9}$.0$^{2,10}$.0$^{4,8}$]pentadec-12-ene-5,7-dione,
(53) 4-(4-chloro-2,5-dimethoxyphenyl)-4-aza-tricyclo[5.2.1.0$^{2,6}$]dec-8-ene-3,5-dione,
(54) 6-(4-chloro-2,5-dimethoxyphenyl)-6-aza-pentacyclo[9.2.1.1$^{3,9}$.0$^{2,10}$.0$^{4,8}$]pentadec-12-ene-5,7-dione,
(55) 4-(5-chloro-2,4-dimethoxyphenyl)-4-aza-tricyclo[5.2.1.0$^{2,6}$]dec-8-ene-3,5-dione,
(56) 6-(5-chloro-2,4-dimethoxyphenyl)-6-aza-pentacyclo[9.2.1.1$^{3,9}$.0$^{2,10}$.0$^{4,8}$]pentadec-12-ene-5,7-dione,
(57) 4-(2,5-diethoxyphenyl)-4-aza-tricyclo[5.2.1.0$^{2,6}$]dec-8-ene-3,5-dione,
(58) 6-(2,5-diethoxyphenyl)-6-aza-pentacyclo[9.2.1.1$^{3,9}$.0$^{2,10}$.0$^{4,8}$]pentadec-12-ene-5,7-dione,
(59) 4-(3-methoxycarbonyl-4-methoxyphenyl)-4-aza-tricyclo[5.2.1.0$^{2,6}$]dec-8-ene-3,5-dione,
(60) 6-(3-methoxycarbonyl-4-methoxyphenyl)-6-aza-pentacyclo[9.2.1.1$^{3,9}$.0$^{2,10}$.0$^{4,8}$]pentadec-12-ene-5,7-dione,
(61) 4-(2-methyl-4-nitrophenyl)-4-aza-tricyclo[5.2.1.0$^{2,6}$]dec-8-ene-3,5-dione,
(62) 6-(2-methyl-4-nitrophenyl)-6-aza-pentacyclo-[9.2.1.1$^{3,9}$.0$^{2,10}$.0$^{4,8}$]pentadec-12-ene-5,7-dione,
(63) 4-(4-nitrophenyl)-4-aza-tricyclo[5.2.1.0$^{2,6}$]dec-8-ene-3,5-dione,
(64) 6-(4-nitrophenyl)-6-aza-pentacyclo[9.2.1.1$^{3,9}$.0$^{2,10}$.0$^{4,8}$]pentadec-12-ene-5,7-dione,
(65) 4-(4-cyanophenyl)-4-aza-tricyclo[5.2.1.0$^{2,6}$]dec-8-ene-3,5-dione,
(66) 6-(4-cyanophenyl)-6-aza-pentacyclo[9.2.1.1$^{3,9}$.0$^{2,10}$.0$^{4,8}$]pentadec-12-ene-5,7-dione,
(67) 4-(4-biphenyl)-4-aza-tricyclo[5.2.1.0$^{2,6}$]dec-8-ene-3,5-dione,
(68) 6-(4-biphenyl)-6-aza-pentacyclo[9.2.1.1$^{3,9}$.0$^{2,10}$.0$^{4,8}$]pentadec-12-ene-5,7-dione,
(69) 4-(2-biphenyl)-4-aza-tricyclo[5.2.1.0$^{2,6}$]dec-8-ene-3,5-dione,
(70) 6-(2-biphenyl)-6-aza-pentacyclo[9.2.1.1$^{3,9}$.0$^{2,10}$.0$^{4,8}$]pentadec-12-ene-5,7-dione,
(71) 4-(3-biphenyl)-4-aza-tricyclo[5.2.1.0$^{2,6}$]dec-8-ene-3,5-dione,
(72) 6-(3-biphenyl)-6-aza-pentacyclo[9.2.1.1$^{3,9}$.0$^{2,10}$.0$^{4,8}$]pentadec-12-ene-5,7-dione,
(73) 4-(2-methoxydibenzofuranyl)-4-aza-tricyclo[5.2.1.0$^{2,6}$]-dec-8-ene-3,5-dione,
(74) 6-(2-methoxydibenzofuranyl)-6-aza-pentacyclo[9.2.1.1$^{3,9}$.0$^{2,10}$.0$^{4,8}$]pentadec-12-ene-5,7-dione,
(75) 4-(9-fluorenyl)-4-aza-tricyclo[5.2.1.0$^{2,6}$]-dec-8-ene-3,5-dione,
(76) 6-(9-fluorenyl)-6-aza-pentacyclo[9.2.1.1$^{3,9}$.0$^{2,10}$.0$^{4,8}$]pentadec-12-ene-5,7-dione,
(77) 2-methyl-4-(2-methylphenyl)-4-aza-tricyclo[5.2.1.0$^{2,6}$]-dec-8-ene-3,5-dione, and
(78) 4-methyl-6-(2-methylphenyl)-6-aza-pentacyclo[9.2.1.1$^{3,9}$.0$^{2,10}$.0$^{4,8}$]pentadec-12-ene-5,7-dione.

These compound may be used as Specific Monomer (I) either singly or in any combination thereof.

The structural formulae of the above-mentioned compounds (1) to (78) are shown below.

[Chemical formula 6]

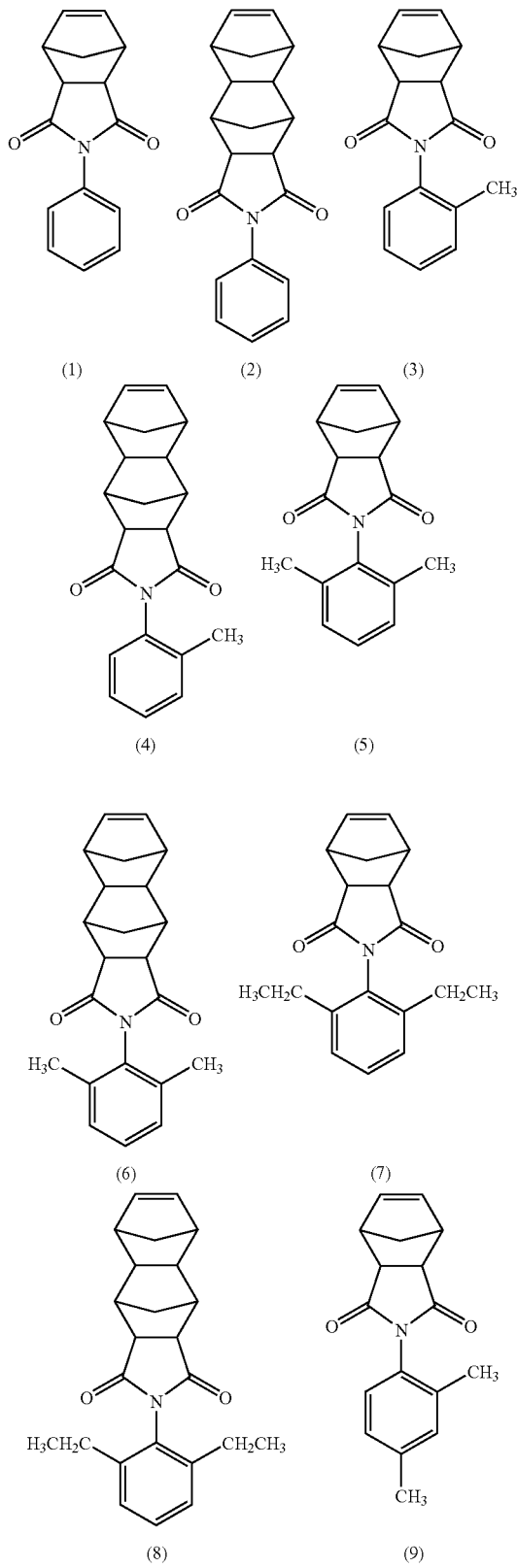

-continued
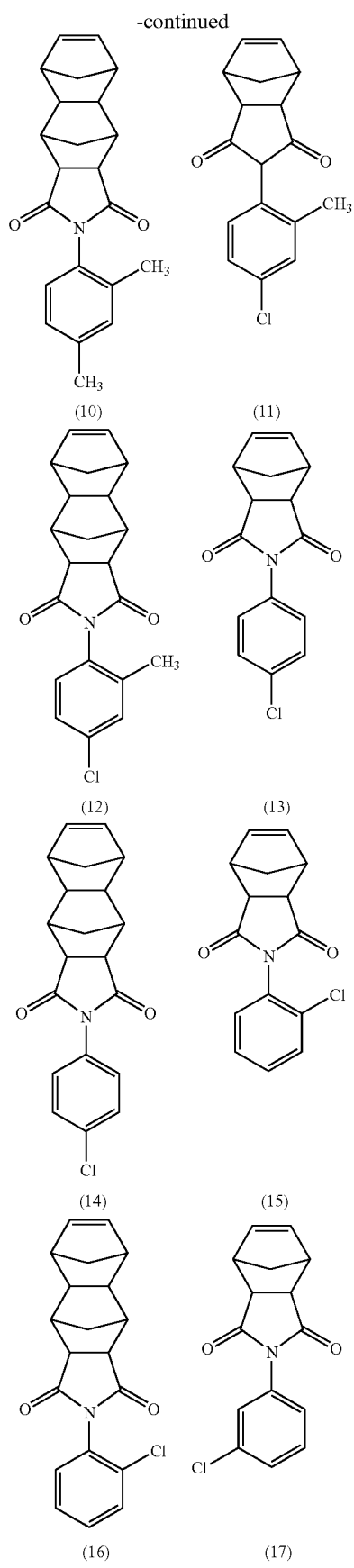
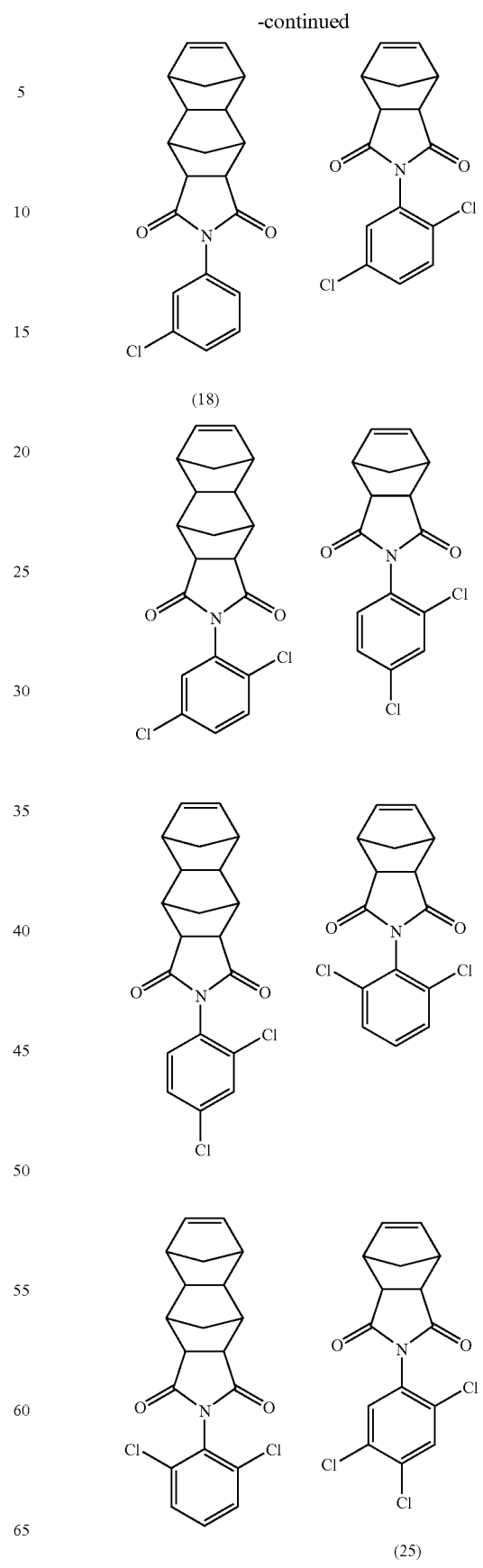

-continued
[Chemical formula 7]
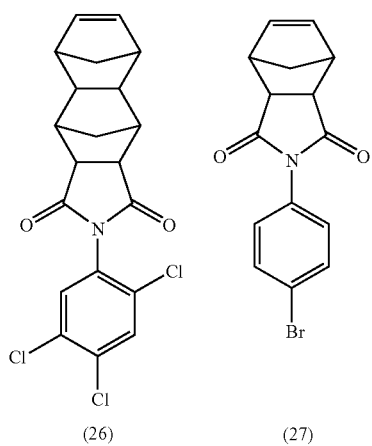
(26) (27)
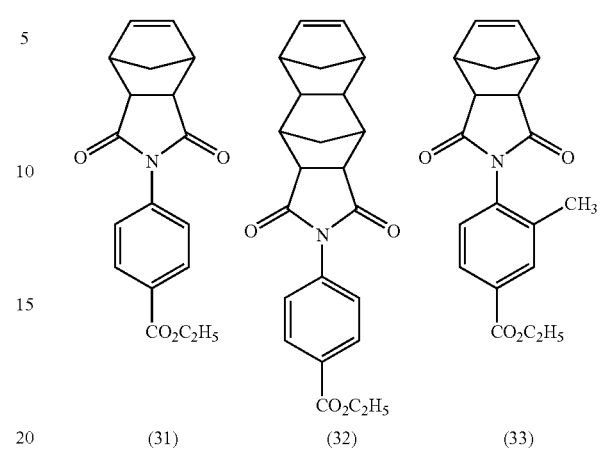
(31) (32) (33)
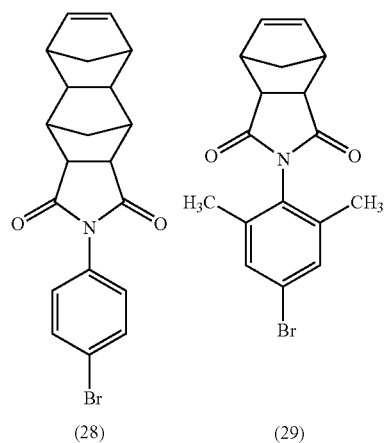
(28) (29)
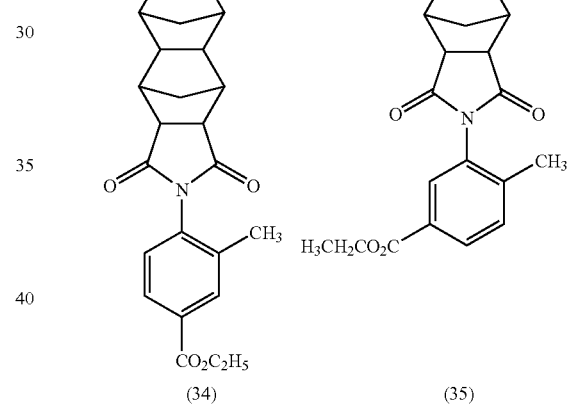
(34) (35)
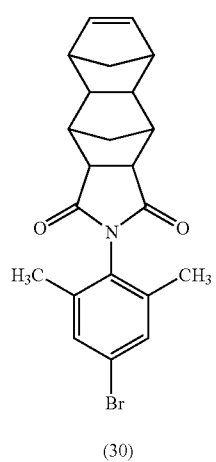
(30)
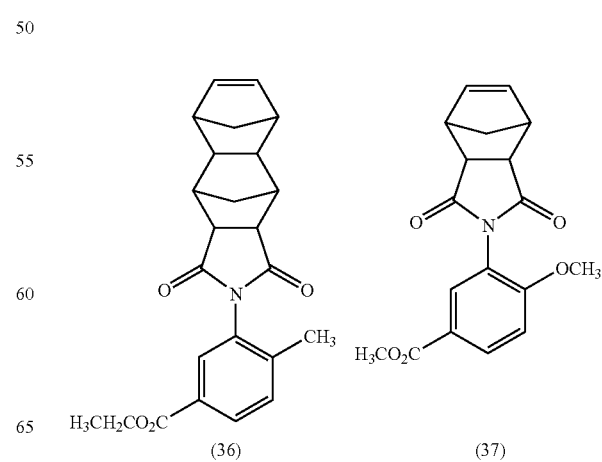
(36) (37)

-continued
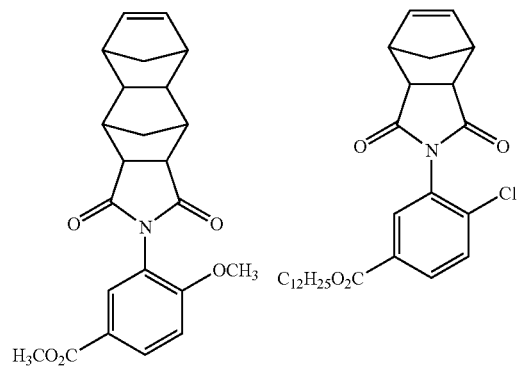
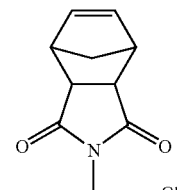
(38) (39)
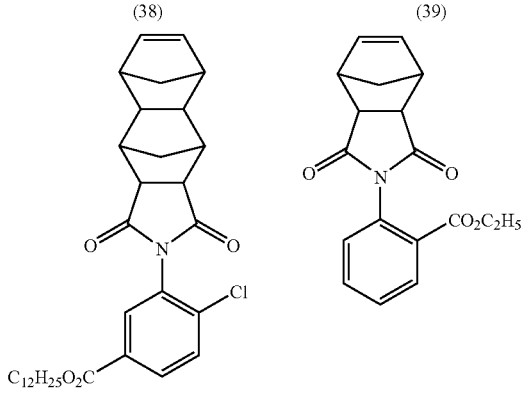
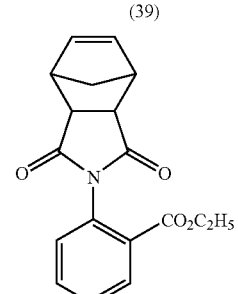
(40) (41)
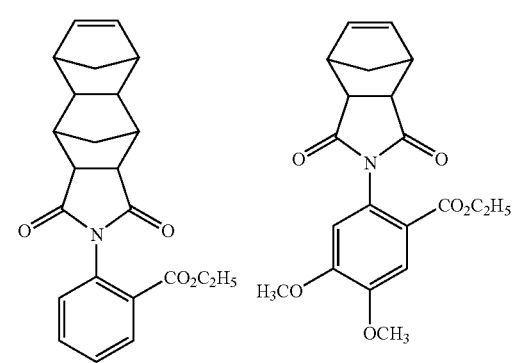
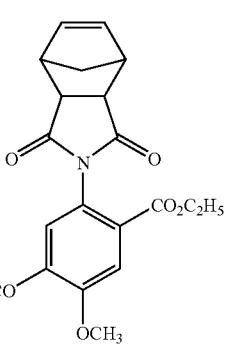
(42) (43)
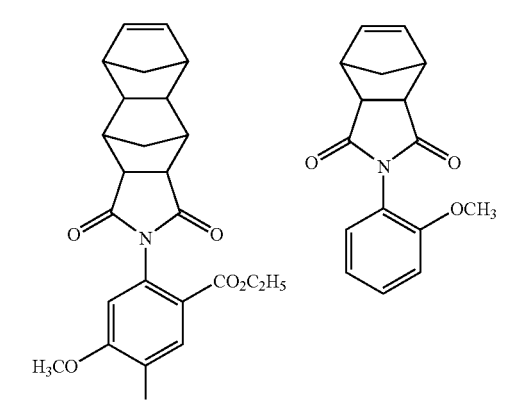
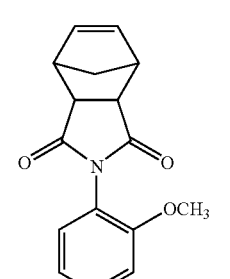
(44) (45)
-continued
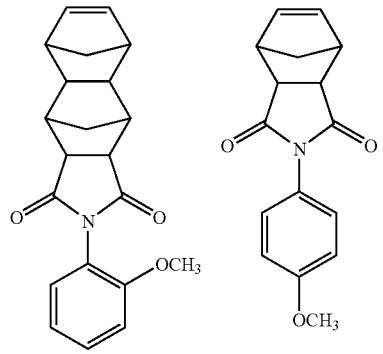
(46) (47)
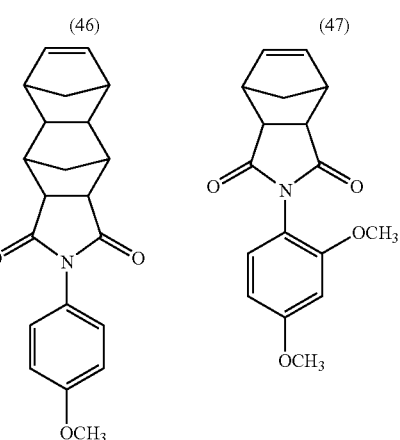
(48) (49)
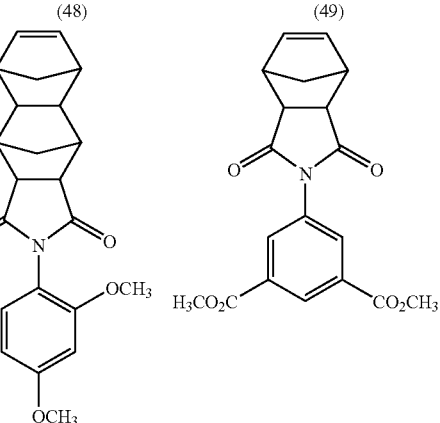
(50) (51)
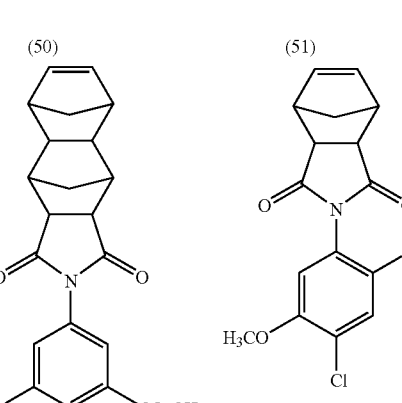
(52) (53)

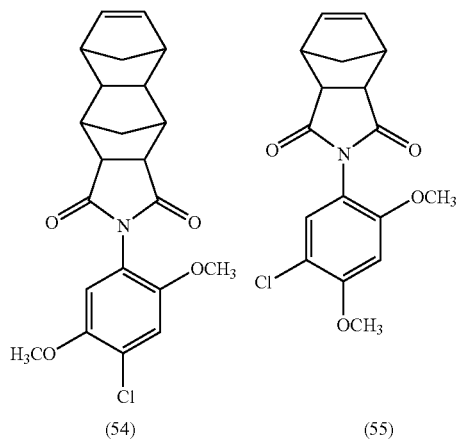
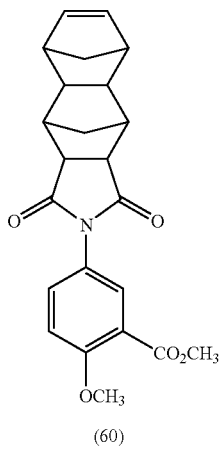
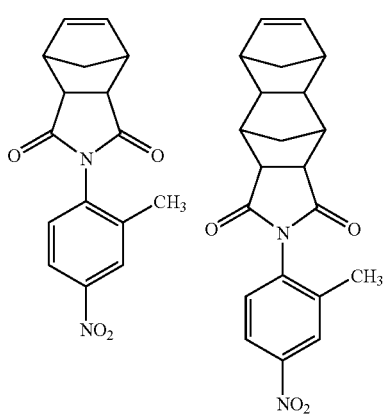
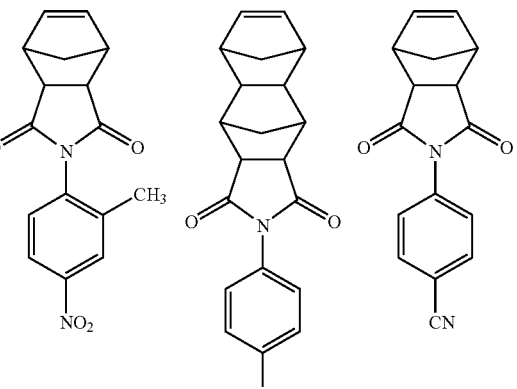

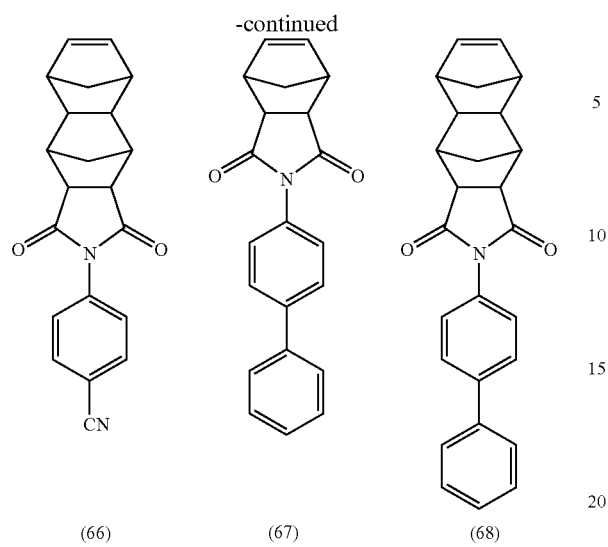
(66)　(67)　(68)
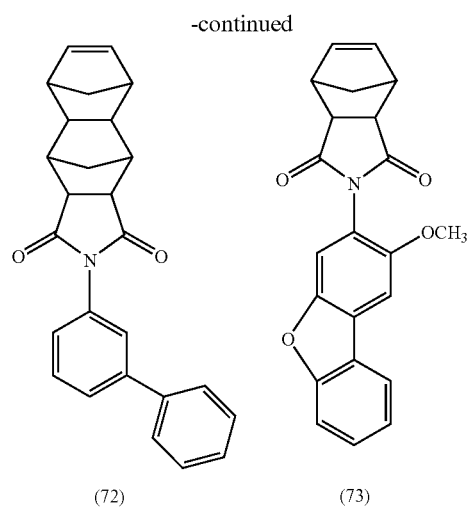
(72)　(73)
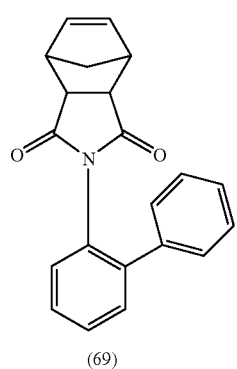
(69)
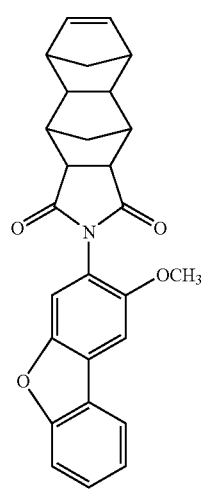
(74)
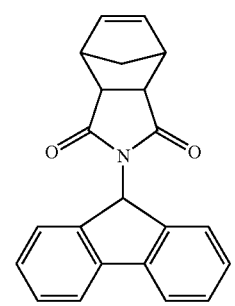
(75)
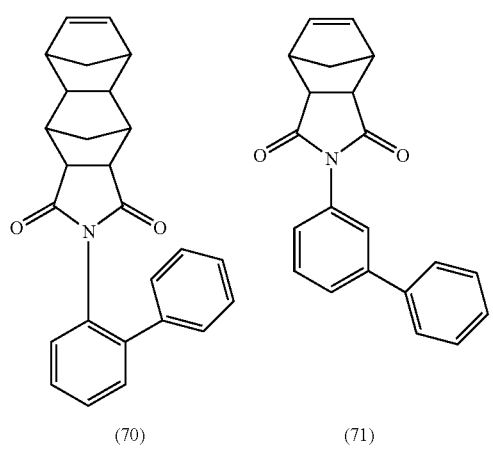
(70)　(71)
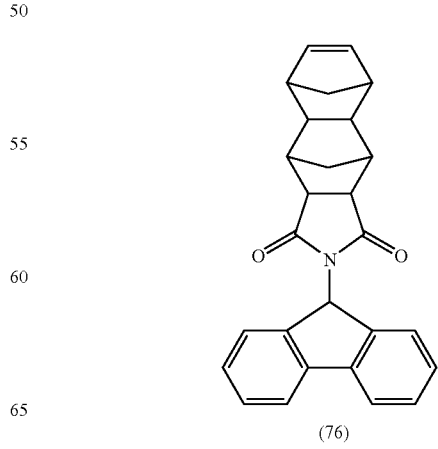
(76)

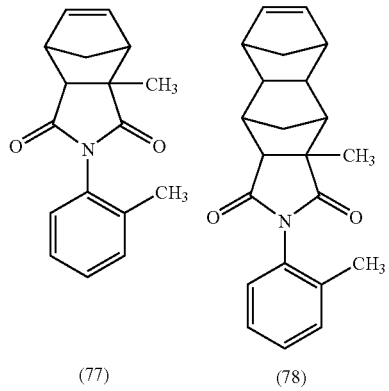

(77)  (78)

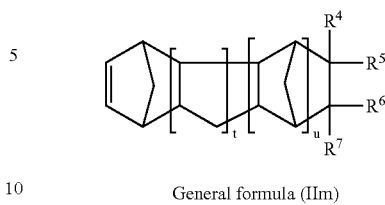

General formula (IIm)

The ring-opened norbornene polymers according to the present invention may have a structural unit (II) represented by the above general formula (II) in addition to the structural unit (I).

In the general formula (II), t and u are, independently of each other, 0 or a positive integer, and preferably t is 0 or 1, and u is an integer of 0 to 3. $X^2$ is an ethylene or vinylene group.

$R^4$ to $R^7$ are, independently of one another, a hydrogen atom; a halogen atom; a substituted or unsubstituted hydrocarbon group having 1 to 30 carbon atoms, which may have a linkage containing or not containing oxygen, sulfur, nitrogen and/or silicon atom(s); or a polar group, with the proviso that $R^4$ and $R^5$, or $R^6$ and $R^7$ may be united with each other to form a divalent hydrocarbon group, or $R^4$ or $R^5$, and $R^6$ or $R^7$ may be bonded to each other to form a carbon ring or heterocyclic ring, and the carbon ring or heterocyclic ring may be either a monocyclic structure or a polycyclic structure. Specific examples of these atoms or groups include the same atoms or groups as those exemplified as $R^1$ and $R^2$ in the general formula (I) and $R^{11}$ to $R^{27}$ in the general formula (I-1) and the general formula (I-2).

As such a structural unit (II), are preferred those, in which in the general formula (II), at least one of $R^4$ to $R^7$ is a carboxylic acid ester group represented by —$(CH_2)_k$COOR$^{29}$, in which $R^{29}$ is a hydrocarbon group having 1 to 20 carbon atoms, and k is an integer of 0 to 10, in that a copolymer good in balance among heat resistance, solubility and adhesion property or adhesive property to other materials, etc. is obtained.

Specific examples of the hydrocarbon group having 1 to 20 carbon atoms represented by $R^{29}$ include alkyl groups such as methyl, ethyl and propyl groups, aryl groups such as a phenyl group, and aralkyl groups such as a benzyl group. Among these, methyl, ethyl and phenyl groups are preferred, with a methyl group being more preferred.

Such a structural unit (II) is obtained by subjecting a norbornene monomer (hereinafter referred to as "Specific Monomer (II)") represented by the following general formula (IIm) to ring-opening copolymerization with Specific Monomer (I).

[Chemical formula 9]

wherein in the general formula (IIm), t and u are, independently of each other, 0 or a positive integer, $R^4$ to $R^7$ denote, independently of one another, a hydrogen atom; a halogen atom; a substituted or unsubstituted hydrocarbon group having 1 to 30 carbon atoms, which may have a linkage containing or not containing oxygen, sulfur, nitrogen and/or silicon atom(s); or a polar group, with the proviso that $R^4$ and $R^5$, or $R^6$ and $R^7$ may be united with each other to form a divalent hydrocarbon group, or $R^4$ and $R^5$, or $R^6$ and $R^7$ may be bonded to each other to form a carbon ring or heterocyclic ring, and the carbon ring or heterocyclic ring may be either a monocyclic structure or a polycyclic structure.

Specific examples of such Specific Monomer (II) include
(79) bicyclo[2.2.1]hept-2-ene,
(80) tricyclo[5.2.1.0$^{2,6}$]dec-8-ene,
(81) tetracyclo[4.4.0.1$^{2,5}$.1$^{7,10}$]dodec-3-ene,
(82) pentacyclo[9.2.1.1$^{4,7}$.0$^{2,10}$.0$^{3,8}$]pentadec-5-ene,
(83) heptacyclo[13.2.1.1$^{3,13}$.1$^{6,9}$.0$^{2,14}$.0$^{4,12}$.0$^{5,10}$]icos-7-ene,
(84) 5-methylbicyclo[2.2.1]hept-2-ene,
(85) 5-ethylbicyclo[2.2.1]hept-2-ene,
(86) 5-n-hexylbicyclo[2.2.1]hept-2-ene,
(87) 5-isopropylbicyclo[2.2.1]hept-2-ene,
(88) 5-n-octylbicyclo[2.2.1]hept-2-ene,
(89) 5-n-decylbicyclo[2.2.1]hept-2-ene,
(90) 5-cyclohexylbicyclo[2.2.1]hept-2-ene,
(91) 5-(3-cyclohexenyl)bicyclo[2.2.1]hept-2-ene,
(92) 5-ethylidenebicyclo[2.2.1]hept-2-ene,
(93) 8-ethylidenetetracyclo[4.4.0.1$^{2,5}$.1$^{7,10}$]dodec-3-ene,
(94) 8-ethyltetracyclo[4.4.0.1$^{2,5}$.1$^{7,10}$]dodec-3-ene,
(95) 5-cyanobicyclo[2.2.1]hept-2-ene,
(96) 5-cyano-5-methylbicyclo[2.2.1]hept-2-ene,
(97) 5-methoxycarbonylbicyclo[2.2.1]hept-2-ene,
(98) 5-methyl-5-methoxycarbonylbicyclo[2.2.1]hept-2-ene,
(99) 5-ethoxycarbonylbicyclo[2.2.1]hept-2-ene,
(100) 8-cyanotetracyclo[4.4.0.1$^{2,5}$.1$^{7,10}$]dodec-3-ene,
(101) 8-methoxycarbonyltetracyclo[4.4.0.1$^{2,5}$.1$^{7,10}$]dodec-3-ene,
(102) 8-ethoxycarbonyltetracyclo[4.4.0.1$^{2,5}$.1$^{7,10}$]dodec-3-ene,
(103) 8-isopropoxycarbonyltetracyclo[4.4.0.1$^{2,5}$.1$^{7,10}$]dodec-3-ene,
(104) 8-n-propoxycarbonyltetracyclo[4.4.0.1$^{2,5}$.1$^{7,10}$]dodec-3-ene,
(105) 8-n-butoxycarbonyltetracyclo[4.4.0.1$^{2,5}$.1$^{7,10}$]dodec-3-ene,
(106) 8-methyl-8-cyanotetracyclo[4.4.0.1$^{2,5}$.1$^{7,10}$]dodec-3-ene,
(107) 8-methyl-8-methoxycarbonyltetracyclo[4.4.0.1$^{2,5}$.1$^{7,10}$]-dodec-3-ene, (108) 8-methyl-8-ethoxycarbonyltetracyclo[4.4.0.1$^{2,5}$.1$^{7,10}$]-dodec-3-ene,
(109) 8-methyl-8-n-propoxycarbonyltetracyclo[4.4.0.1$^{2,5}$.1$^{7,10}$]dodec-3-ene,
(110) 8-methyl-8-isopropoxycarbonyltetracyclo[4.4.0.1$^{2,5}$.1$^{7,10}$]dodec-3-ene,
(111) 8-methyl-8-n-butoxycarbonyltetracyclo[4.4.0.1$^{2,5}$.1$^{7,10}$]dodec-3-ene,
(112) 8-phenoxycarbonyltetracyclo[4.4.0.1$^{2,5}$.1$^{7,10}$]-dodec-3-ene,
(113) 8-(1-naphthoxy)carbonyltetracyclo[4.4.0.1$^{2,5}$.1$^{7,10}$]-dodec-3-ene,
(114) 8-(2-naphthoxy)carbonyltetracyclo[4.4.0.1$^{2,5}$.1$^{7,10}$]-dodec-3-ene,
(115) 8-(4-phenylphenoxy)carbonyltetracyclo[4.4.0.1$^{2,5}$.1$^{7,10}$]dodec-3-ene,
(116) 8-methyl-8-phenoxycarbonyltetracyclo[4.4.0.1$^{2,5}$.1$^{7,10}$]-dodec-3-ene,
(117) 8-methyl-8-(1-naphthoxy)carbonyltetracyclo[4.4.0.1$^{2,5}$.1$^{7,10}$]dodec-3-ene,
(118) 8-methyl-8-(2-naphthoxy)carbonyltetracyclo[4.4.0.1$^{2,5}$.1$^{7,10}$]dodec-3-ene,
(119) 8-methyl-8-(4-phenylphenoxy)carbonyltetracyclo-[4.4.0.1$^{2,5}$.1$^{7,10}$]dodec-3-ene,
(120) 5-phenylbicyclo[2.2.1]hepto-2-ene,
(121) 5-(1-naphthyl)bicyclo[2.2.1]hepto-2-ene,
(122) 5-(2-naphthyl)bicyclo[2.2.1]hepto-2-ene,
(123) 5-(4-biphenyl)bicyclo[2.2.1]hepto-2-ene,
(124) 5-(2-naphthyl)-5-methylbicyclo[2.2.1]hepto-2-ene,
(125) 5-(4-biphenyl)-5-methylbicyclo[2.2.1]hepto-2-ene,
(126) 8-phenyltetracyclo[4.4.0.1$^{2,5}$.1$^{7,10}$]-3-dodecene,
(127) 5-hydroxybicyclo[2.2.1]hepto-2-ene,
(128) 5-methoxybicyclo[2.2.1]hepto-2-ene,
(129) 5-hydroxymethylbicyclo[2.2.1]hepto-2-ene,
(130) 5-aminomethylbicyclo[2.2.1]hepto-2-ene,
(131) 5-chloromethylbicyclo[2.2.1]hepto-2-ene,
(132) 5-trimethoxysilylbicyclo[2.2.1]hepto-2-ene,
(133) 5-triethoxysilylbicyclo[2.2.1]hepto-2-ene,
(134) 5-tri-n-propoxysilylbicyclo[2.2.1]hepto-2-ene,
(135) 5-tri-n-butoxysilylbicyclo[2.2.1]hepto-2-ene,
(136) 5-fluorobicyclo[2.2.1]hepto-2-ene,
(137) 5-fluoromethylbicyclo[2.2.1]hepto-2-ene,
(138) 5-trifluoromethylbicyclo[2.2.1]hepto-2-ene,
(139) 5-pentafluoroethylbicyclo[2.2.1]hepto-2-ene,
(140) 5,5-difluorobicyclo[2.2.1]hepto-2-ene,
(141) 5,6-difluorobicyclo[2.2.1]hepto-2-ene,
(142) 5,5-bis(trifluoromethyl)bicyclo[2.2.1]hepto-2-ene,
(143) 5,6-bis(trifluoromethyl)bicyclo[2.2.1]hepto-2-ene,
(144) 5-methyl-5-trifluoromethylbicyclo[2.2.1]hepto-2-ene,
(145) 5,5,6-trifluorobicyclo[2.2.1]hepto-2-ene,
(146) 5,5,6-tris(fluoromethyl)bicyclo[2.2.1]hepto-2-ene,
(147) 5,5,6,6-tetrafluorobicyclo[2.2.1]hepto-2-ene,
(148) 5,5,6,6-tetrakis(trifluoromethyl)bicyclo[2.2.1]hepto-2-ene,
(149) 5,5-difluoro-6,6-bis(trifluoromethyl)bicyclo[2.2.1]-hepto-2-ene,
(150) 5-fluoro-6-pentafluoroethylbicyclo[2.2.1]-hepto-2-ene,
(151) 5-chloro-5,6,6-trifluorobicyclo[2.2.1]hepto-2-ene,
(152) 5,5,6-trifluoro-6-trifluoromethoxybicyclo[2.2.1]-hepto-2-ene,
(153) 8-fluorotetracyclo[4.4.0.1$^{2,5}$.1$^{7,10}$]dodec-3-ene,
(154) 8-fluoromethyltetracyclo[4.4.0.1$^{2,5}$.1$^{7,10}$]dodec-3-ene,
(155) 8-trifluoromethyltetracyclo[4.4.0.1$^{2,5}$.1$^{7,10}$]dodec-3-ene,
(156) 8-pentafluoroethyltetracyclo[4.4.0.1$^{2,5}$.1$^{7,10}$]dodec-3-ene,
(157) 8,8-difluorotetracyclo[4.4.0.1$^{2,5}$.1$^{7,10}$]dodec-3-ene,
(158) 8,9-difluorotetracyclo[4.4.0.1$^{2,5}$.1$^{7,10}$]dodec-3-ene,
(159) 8,8-bis(trifluoromethyl)tetracyclo[4.4.0.1$^{2,5}$.1$^{7,10}$]-dodec-3-ene,
(160) 8,9-bis(trifluoromethyl)tetracyclo[4.4.0.1$^{2,5}$.1$^{7,10}$]-dodec-3-ene,
(161) 8-methyl-8-trifluoromethyltetracyclo[4.4.0.1$^{2,5}$.1$^{7,10}$]dodec-3-ene,
(162) 8,8,9-trifluorotetracyclo[4.4.0.1$^{2,5}$.1$^{7,10}$]dodec-3-ene,
(163) 8,8,9-tris(trifluoromethyl)tetracyclo[4.4.0.1$^{2,5}$.1$^{7,10}$]dodec-3-ene,
(164) 8,8,9,9-tetrafluorotetracyclo[4.4.0.1$^{2,5}$.1$^{7,10}$]dodec-3-ene,
(165) 8,8,9,9-tetrakis(trifluoromethyl)tetracyclo[4.4.0.1$^{2,5}$.1$^{7,10}$]dodec-3-ene,
(166) 8,8-difluoro-9,9-bis(trifluoromethyl)tetracyclo-[4.4.0.1$^{2,5}$.1$^{7,10}$]dodec-3-ene,
(167) 8,9-difluoro-8,9-bis(trifluoromethyl)tetracyclo-[4.4.0.1$^{2,5}$.1$^{7,10}$]dodec-3-ene, and
(168) 8,8,9-trifluoro-9-trifluoromethoxytetracyclo-[4.4.0.1$^{2,5}$.1$^{7,10}$]dodec-3-ene.

These compound may be used as Specific Monomer (II) either singly or in any combination thereof.

The structural formulae of the above-mentioned compounds (79) to (168) are shown below.

[Chemical formula 10]

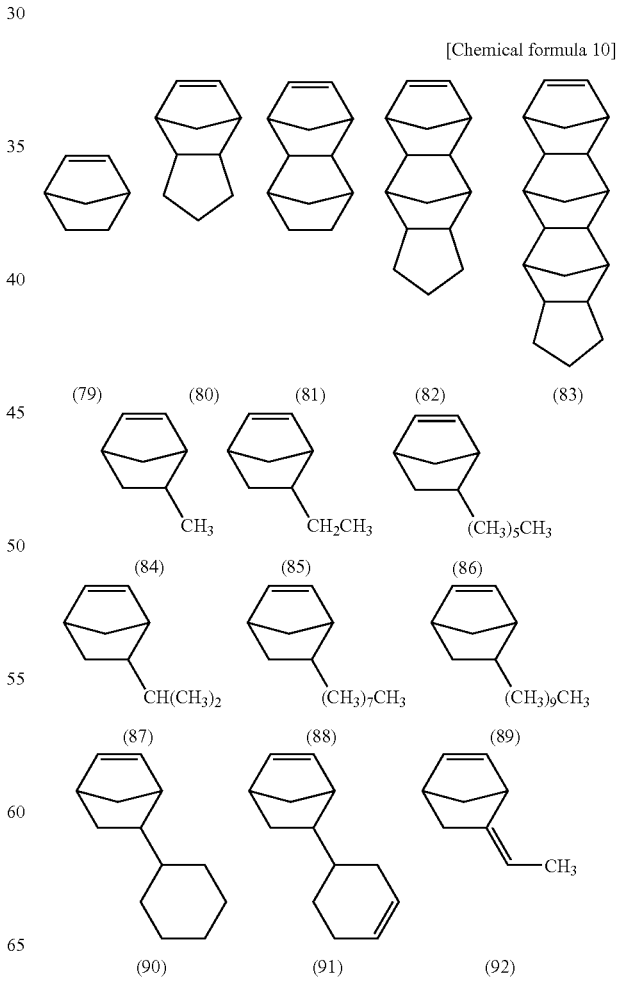

-continued
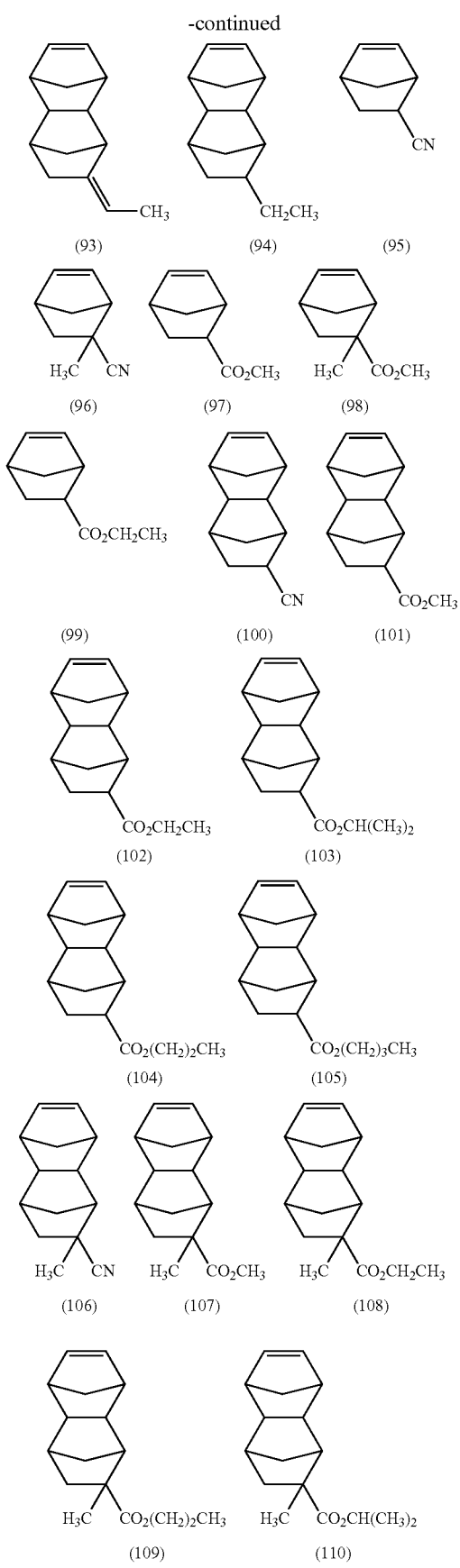
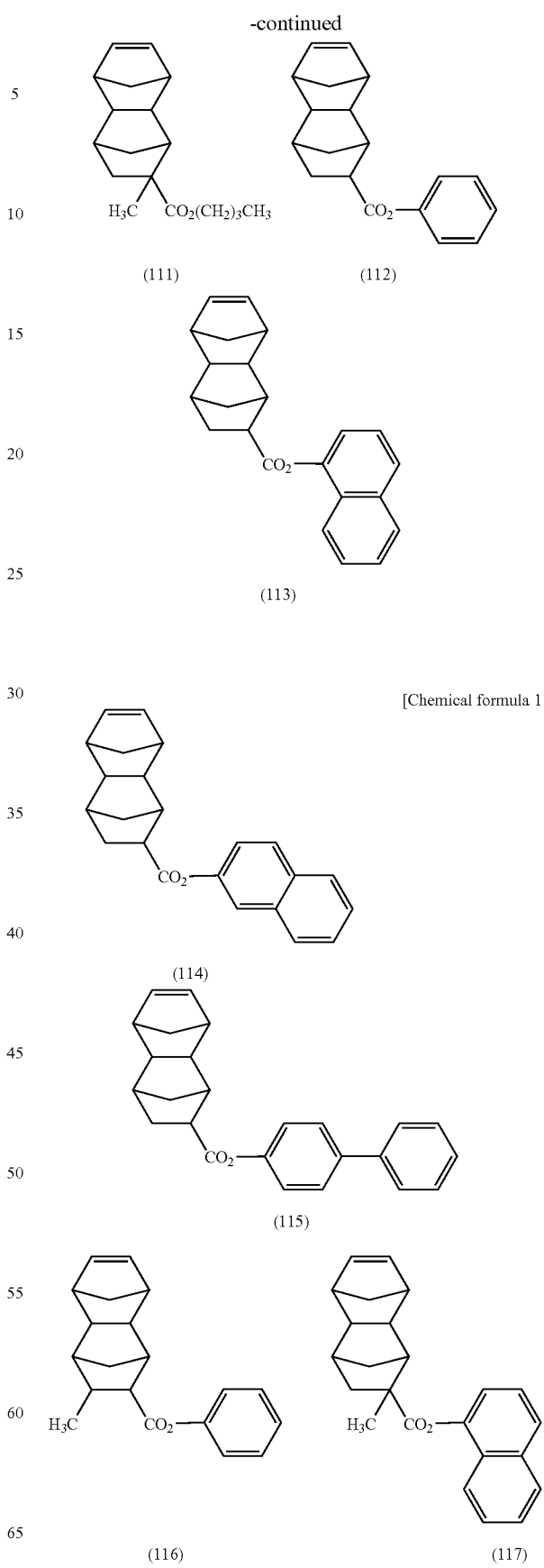

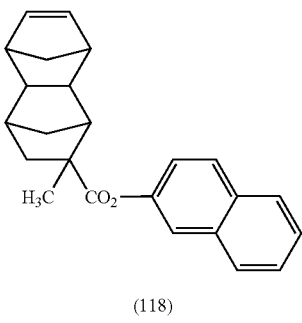
(118)
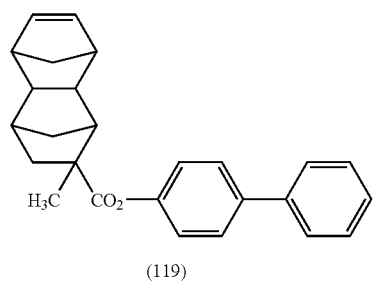
(119)
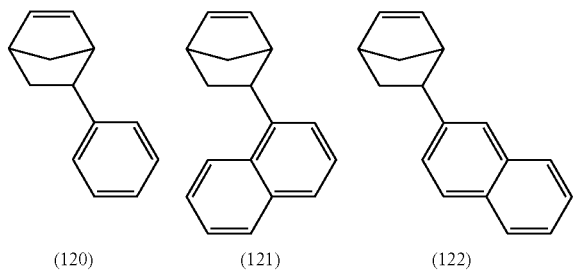
(120)  (121)  (122)
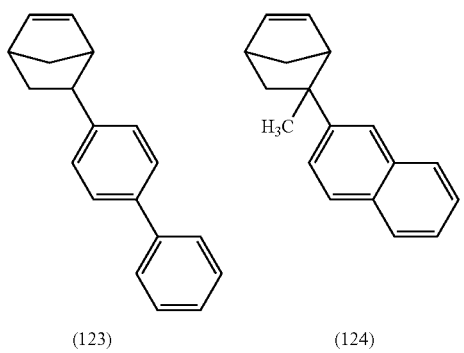
(123)  (124)
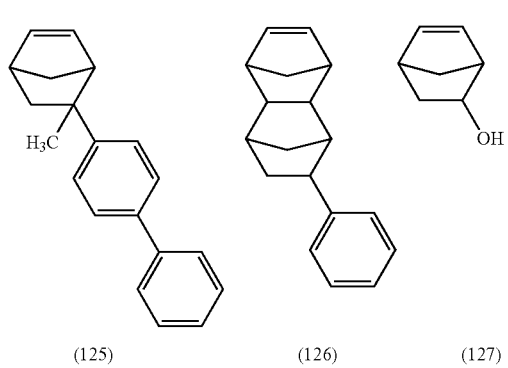
(125)  (126)  (127)
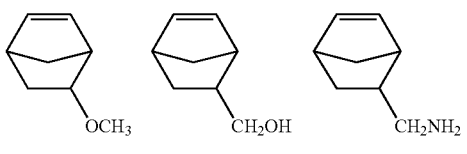
(128)  (129)  (130)
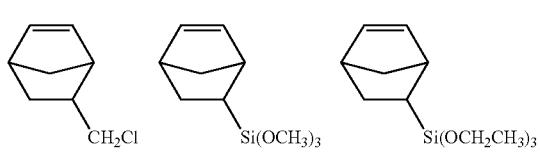
(131)  (132)  (133)
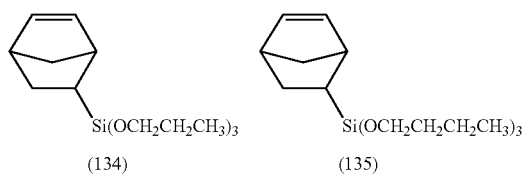
(134)  (135)
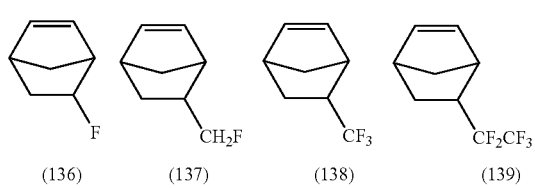
(136)  (137)  (138)  (139)
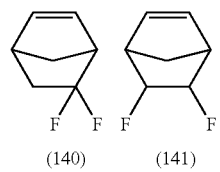
(140)  (141)
[Chemical formula 12]
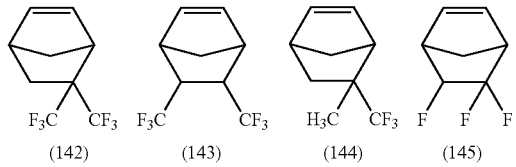
(142)  (143)  (144)  (145)
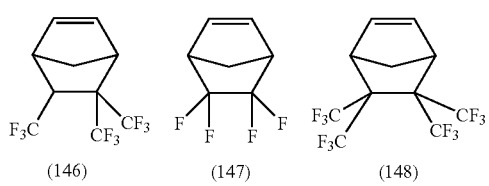
(146)  (147)  (148)
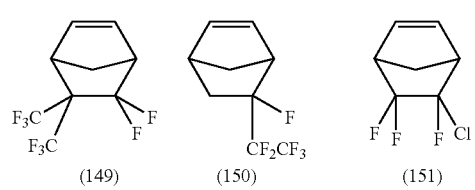
(149)  (150)  (151)

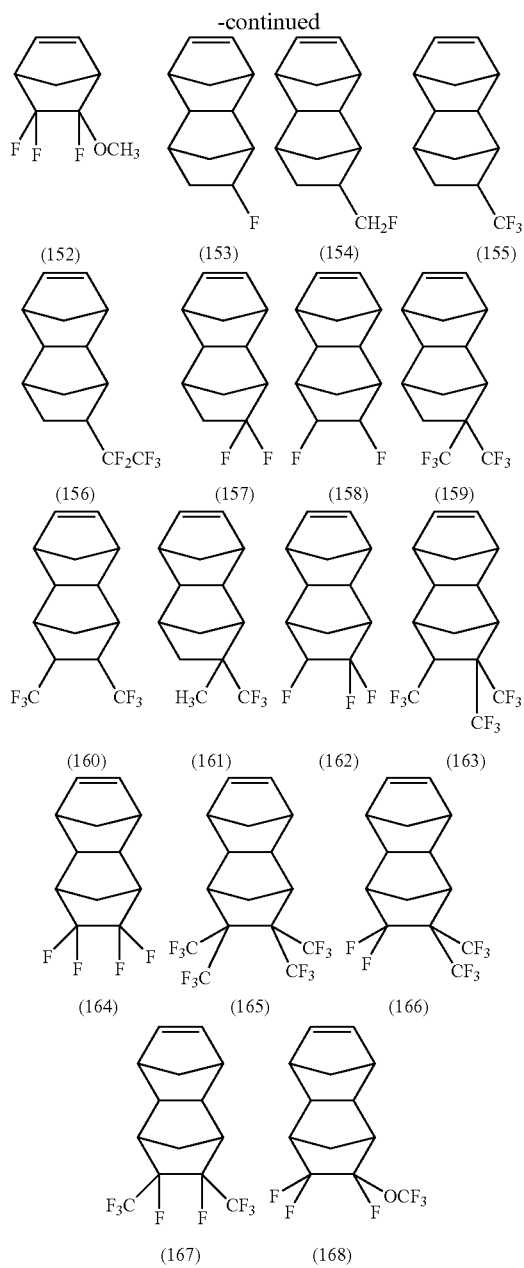

Among these, 8-methyl-8-methoxycarbonyltetracyclo-[4.4.0.1²,⁵.1⁷,¹⁰]dodec-3-ene is particularly preferred in that its preparation process is easy.

When the structural unit (II) is contained in the ring-opened norbornene polymer according to the present invention, the proportion of the structural unit (II) is preferably at most 98 mol % based on the whole structural unit.

A ratio of the structural unit (I) to the structural unit (II) is generally 100:0 to 2:98, preferably 100:0 to 5:95, more preferably 100:0 to 10:90 in terms of a molar ratio.

If the proportion of the structural unit (II) is too high, the specific wavelength dependency about birefringence on that birefringence becomes greater as the wavelength of transmitted light becomes longer, and low birefringence may not be achieved in some cases.

In the ring-opened norbornene polymers according to the present invention, the total proportion of the structural unit (I) that $X^1$ in the general formula (I) is an ethylene group and the structural unit (II) that $X^2$ in the general formula (II) is an ethylene group is preferably at least 90 mol %, more preferably at least 95 mol %, still more preferably at least 98 mol % of the structural unit (I) and the structural unit (II). If this proportion is too low, the heat resistance of the resulting ring-opened norbornene polymer may become low in some cases.

The ring-opened norbornene polymers according to the present invention may have any other structural unit (hereinafter referred to as "further structural unit") than the structural unit (I) and the structural unit (II).

As monomers for obtaining such further structural unit, may be used cycloolefins such as cyclobutane, cyclopentene, cyclooctene and cyclododecene, and non-conjugated cyclic polyenes such as 1,4-cyclooctadiene, dicyclopentadiene and cyclododecatriene.

In the present invention, ring-opening polymerization of Specific Monomer (I), Specific Monomer (II) and the other monomer(s) may be conducted in the presence of polybutadiene, polyisoprene, a styrene-butadiene polymer, an ethylene-non-conjugated diene polymer, an unhydrogenated product of a ring-opened (co)polymer of a norbornene monomer, or the like.

When the further structural unit is contained in the ring-opened norbornene polymer according to the present invention, the proportion of the structural unit (I) is preferably at least 2 mol %, more preferably at least 5 mol %, still more preferably at least 10 mol % based on the whole structural unit.

If the proportion of the structural unit (I) is too low, the specific wavelength dependency about birefringence on that birefringence becomes greater as the wavelength of transmitted light becomes longer, and low birefringence may not be achieved in some cases.

The ring-opened norbornene polymer according to the present invention has a logarithmic viscosity (ηinh) of generally 0.2 to 5.0, preferably 0.3 to 4.0, more preferably 0.35 to 2.0 as measured by a Ubbelohde viscometer.

Its number average molecular weight (Mn) in terms of polystyrene as measured by gel permeation chromatography (GPC; tetrahydrofuran solvent) is generally 1,000 to 500,000, preferably 2,000 to 300,000, more preferably 5,000 to 300,000, and its weight average molecular weight (Mw) as measured in the same manner as described above is generally 5,000 to 2,000,000, preferably 10,000 to 1,000,000, more preferably 15,000 to 500,000.

If the logarithmic viscosity (ηinh) is lower than 0.2, the number average molecular weight (Mn) is lower than 1,000, or the weight average molecular weight (Mw) is lower than 5,000, the strength of such a ring-opened norbornene polymer may become markedly low in some cases. On the other hand, if the logarithmic viscosity (ηinh) exceeds 5.0, the number average molecular weight (Mn) exceeds 500,000, or the weight average molecular weight (Mw) exceeds 2,000,000, the melt viscosity or solution viscosity of such a ring-opened norbornene polymer may become too high in some cases, resulting in difficulty in providing a desired molded or formed product.

Publicly known various additives may be added to the ring-opened norbornene polymers according to the present invention.

Specifically, a phenolic or hydroquinone antioxidant such as triethylene glycol-bis[3-(3-t-butyl-5-methyl-4-hydroxyphenyl)propionate], 1,6-hexanediol-bis[3-(3,5-di-t-butyl-4-hydroxyphenyl)propionate], 2,4-bis(n-octylthio)-6-(4-hydroxy-3,5-di-t-butylanilino)-1,3,5-triazine, pentaerythrityltetrakis[3-(3,5-di-t-butyl-4-hydroxyphenyl)propionate], 2,2-thio-diethylenebis[3-(3,5-di-t-butyl-4-hydroxyphenyl)propionate], octadecyl-3-(3,5-di-t-butyl-4-hydroxyphenyl)propionate, N,N'-hexamethylenebis(3,5-di-t-butyl-4-hydroxy)-hydrocinnamamide, 3,5-t-butyl-4-hydroxy-4-benzylphosphonate-diethyl ester or 1,3,5-trimethyl-2,4,6-tris(3',5'-di-t-butyl-4-hydroxybenzyl)benzene, or a phosphorus antioxidant such as tris(4-methoxy-3,5-diphenyl)phosphite, tris(nonylphenyl)phosphite or tris(2,4-di-t-butylphenyl)phosphite may be used. The oxidation stability of the resulting ring-opened norbornene polymer can be improved by adding one or more of these antioxidants.

An ultraviolet absorbent such as 2,4-dihydroxy-benzophenone, 2-hydroxy-4-methoxybenzophenone or 2,2-methylenebis[4-(1,1,3,3-tetramethylbutyl)-6-[(2H-benzotriazol-2-yl)phenol]], or of the hindered amine type or benzoate type may also be used. The light resistance of the resulting ring-opened norbornene polymer can be improved by adding one or more of these ultraviolet absorbents.

Additives such as a lubricant may also be added for the purpose of improving processability.

The ring-opened norbornene polymer according to the present invention can be prepared by subjecting Specific Monomer (I) to ring-opening polymerization or subjecting Specific Monomer (I) to ring-opening copolymerization with Specific Monomer (II) and the other monomer(s) used as needed, or subjecting these monomers to ring-opening (co)polymerization and then further hydrogenating the resultant (co)polymer.

[Ring-Opening Polymerization Catalyst]

As ring-opening polymerization catalysts used in the present invention, are used catalysts described in Olefin Metathesis and Metathesis Polymerization (K. J. IVIN, J. C. MOL, Academic Press, 1997), for example, the following metathesis polymerization catalysts. More specifically, those are catalysts composed of a combination of (a) at least one selected from compounds of W, Mo, Re, V and Ti and (b) at least one selected from compounds of Li, Na, K, Mg, Ca, Zn, Cd, Hg, B, Al, Si, Sn, Pb and the like, which have at least one element-carbon bond, or at least one element-hydrogen bond. In order to enhance activity of the catalyst in this case, an additive (c), which will be described subsequently, may also be added. Examples of other catalysts include (d) metathesis catalysts composed of a carbene complex of a metal of Group 4 to Group 8 of the periodic table or metallacyclo butene complex using no promoter.

As typical examples of the compounds of W, Mo, Re, V and Ti, which are suitable for use as the component (a), may be mentioned the compounds described in Japanese Patent Application Laid-Open No. 240517/1989, such as $WCl_6$, $MoCl_5$, $ReOCl_3$, $VOCl_3$ and $TiCl_4$.

As specific examples of the compounds used as the component (b), may be mentioned the compounds described in Japanese Patent Application Laid-Open No. 240517/1989, such as n-$C_4H_9Li$, $(C_2H_5)_3Al$, $(C_2H_5)_2AlCl$, $(C_2H_5)_{1.5}AlCl_{1.5}$, $(C_2H_5)AlCl_2$, methyl alumoxane and LiH.

As typical examples of the additive, which is the component (c), may be suitably used alcohols, aldehydes, ketones and amines. Further, the compounds described in Japanese Patent Application Laid-Open No. 240517/1989 may also be used.

Typical examples of the component (d) include W(=N-2,6-$C_6H_3{}^iPr_2$)(=CH$^t$Bu)(O$^t$Bu)$_2$, Mo(=N-2,6-$C_6H_3{}^iPr_2$)(=CH$^t$Bu)(O$^t$Bu)$_2$, Ru(=CHCH=CPh$_2$)(PPh$_3$)$_2$Cl$_2$ and Ru(=CHPh)(PC$_6$H$_{11}$)$_2$Cl.

The amount of the metathesis catalyst used is within a range that a proportion of the component (a) to the total of Specific Monomer (I) and Specific Monomer (II) amounts to 1:500 to 1:500,000 in terms of a molar ratio, preferably 1:1,000 to 1:100,000.

A proportion of the component (a) to the component (b) is within a range of 1:1 to 1:100 in terms of a metal atom ratio of "the component (a) to the component (b)", preferably 1:2 to 1:50. A proportion of the component (a) to the component (c) is within a range of 0.005:1 to 15:1 in terms of a molar ratio of "the component (c) to the component (a)", preferably 0.05:1 to 10:1. The amount of the catalyst (d) used is within a range that a proportion of the component (d) to the total of Specific Monomer (I) and Specific Monomer (II) amounts to 1:30 to 1:100,000 in terms of a molar ratio, preferably 1:50 to 1:50,000.

[Molecular Weight Modifier]

The molecular weight of the ring-opened polymer may also be controlled by a polymerization temperature, the kind of a catalyst used and the kind of a solvent used. In the present invention, however, the molecular weight is preferably controlled by causing a molecular weight modifier to coexist in the reaction system. As examples of molecular weight modifiers suitable for use herein, may be mentioned α-olefins such as ethylene, propene, 1-butene, 1-pentene, 1-hexene, 1-heptene, 1-octene, 1-nonene and 1-decene, and styrene. Among these, 1-butene and 1-hexene are particularly preferred. These molecular weight modifiers may be used either singly or in any combination thereof.

The amount of the molecular weight modifier used is 0.005 to 1.0 mol, preferably 0.02 to 0.5 mol per mol in total of Specific Monomer (I) and Specific Monomer (II) used in the ring-opening (co)polymerization reaction.

[Ring-Opening Polymerization Solvent]

As specific examples of a solvent (solvent for dissolving the monomers, metathesis catalyst and molecular weight modifier) used in the ring-opening polymerization reaction, may be mentioned alkanes such as pentane, hexane, heptane, octane, nonane and decane; cycloalkanes such as cyclohexane, cyclopentane, cyclooctane, decalin and norbornene; aromatic hydrocarbons such as benzene, toluene. xyclene. ethylbenzene and cumene: halogenated alkanes such as chlorobutane, bromohexane, methylene chloride, dichloroethane, hexamethylene dibromide, chlorobenzene, chloroform and tetrachloroethylene; aryl compounds; saturated carboxylic acid esters such as ethyl acetate, n-butyl acetate, isobutyl acetate, methyl propionate and dimethoxyethane; and ethers such as dibutyl ether, tetrahydrofuran and dimethoxyethane. These solvents may be used either singly or in any combination thereof. Among these, the aromatic hydrocarbons are preferred.

The amount of the solvent used is such that a weight ratio of "solvent to monomer(s)" amounts to 1:1 to 30:1, preferably 1:1 to 20:1.

The ring-opened norbornene polymer obtained by the above-described ring-opening polymerization has the structural unit (I) and structural unit (II), in which both $X^1$ in the general formula (I) and $X^2$ in the general formula (II) are vinylene groups. Such a polymer may be used in various application fields as it is. From the viewpoint of heat stability, however, a part or the whole of the vinylene groups in the ring-opened polymer are preferably hydrogenated into ethylene groups to provide a hydrogenated product. In such a hydrogenated product, the aromatic rings located at side chains based on Specific Monomers (I) and (II) are preferably substantially not hydrogenated.

The hydrogenation rate of the vinylene groups is preferably at least 90%, more preferably at least 95%, still more preferably at least 98%. Coloration or deterioration by heat is more inhibited as the hydrogenation rate is higher. It is hence preferable that the hydrogenation rate be higher.

It is necessary to conduct the hydrogenation reaction under conditions that the aromatic rings located at side chains based on Specific Monomers (I) and (II) are substantially not hydrogenated. In general, the hydrogenation reaction is conducted by adding a hydrogenation catalyst to a solution of the ring-opened polymer and causing hydrogen gas of normal pressure to 300 atm, preferably 3 to 200 atm to act on the solution at 0 to 200° C., preferably 20 to 180° C.

As the hydrogenation catalyst, may be used that used in an ordinary hydrogenation reaction of an olefinic compound. As such a hydrogenation catalyst, may be used either a heterogeneous catalyst or a homogenous catalyst. As specific examples of the heterogeneous catalyst, may be mentioned solid catalysts with a noble metal catalytic substance such as palladium, platinum, nickel, rhodium or ruthenium carried on a carrier such as carbon, silica, alumina or titania. As specific examples of the homogenous catalyst, may be mentioned nickel naphthenate/triethylaluminum, nickel acetylacetonate/triethylaluminum, cobalt octanoate/n-butyllithium, titanocene dichloride/diethylaluminum monochloride, rhodium acetate, chlorotris(triphenylphosphine)rhodium, dichlorotris-(triphenylphosphine)ruthenium, chlorohydrocarbonyltris-(triphenylphosphine)ruthenium and dichlorocarbonyltris-(triphenylphosphine)ruthenium. The form of the catalyst may be either powder or particles.

In order to substantially prevent the aromatic rings located at the side chains based on Specific Monomers (I) and (II) from being hydrogenated, it is necessary to control the amount of these hydrogenation catalysts. However, the catalyst is generally used in a proportion that a weight ratio of "the ring-opened polymer to "the hydrogenation catalyst" amounts to $1:(1\times10^{-6})$ to 1:2.

Since the ring-opened norbornene polymers according to the present invention exhibit specific wavelength dependency about birefringence and have low birefringence and high heat resistance and transparency, they are useful in fields of optical parts, electric and electronic materials, etc. Specifically, they are useful as disks, magneto-optical, optical lenses (FΘ lenses, pickup lenses, lenses for laser printers, lenses for cameras, etc.), spectacle lenses, optical films (films for display, phase difference films, polarizing films, transparent conductive films, wave plates, optical pickup films, etc.), liquid crystal orientation films, optical sheets, optical fibers, light guide plates, light-diffusing plates, optical cards, optical mirrors, and sealing materials for semiconductors such as IC, LSI and LED.

EXAMPLES

The ring-opened norbornene polymer of the present invention will hereinafter be described specifically by the following Examples. However, the present invention is not limited to these examples.

In the following Examples and Comparative Example, the glass transition temperature (Tg), number average molecular weight (Mn), weight average molecular weight (Mw) and molecular weight distribution (Mw/Mn) were measured or determined in accordance with the following respective methods.

[Glass Transition Temperature (Tg)]

The glass transition temperature of a sample was measured at a heating rate of 20° C./min under a nitrogen atmosphere by means of a differential scanning calorimeter manufactured by Seiko Instruments Inc. Number average molecular weight, weight average molecular weight and molecular weight distribution:

The number average molecular weight, weight average molecular weight and molecular weight distribution in terms of polystyrene of a sample were measured by "HLC-8020 Gel Permeation Chromatograph" manufactured by TOSOH CORP. using tetrahydrofuran as a solvent.

Referential Example

Synthesis of Specific Monomer (I)

A 1-L three neck flask equipped with a reflux condenser was charged with 30 g (0.1303 mol) of 6-oxa-pentacyclo-[9.2.1.1$^{3,9}$.0$^{2,10}$.0$^{4,8}$]pentadec-12-ene-5,7-dione represented by the following structural formula (B) and 19.96 g (0.1303 mol) of 2,4-dimethoxyaniline, and 300 mL of acetic acid was further added as a solvent. When this reaction system was heated, the reaction system became a homogeneous state. In this state, the reaction system was refluxed for 3 hours. After the reaction system was allowed to cool, a removing treatment of acetic acid was conducted by an evaporator, and the residue was recrystallized from methanol to obtain 44.96 g (rough yield: 94%) of a reddish brown solid. The thus-obtained crystals were recrystallized from methanol, thereby obtaining 19.74 g (yield: 41%) of a white solid. This white solid was identified as 6-(2,4-dimethoxyphenyl)-6-aza-pentacyclo[9.2.1.1$^{3,9}$.0$^{2,10}$.0$^{4,8}$]pentadec-12-ene-5,7-dione represented by the following structural formula (A).

[Chemical formula 13]

Structural formula (A):

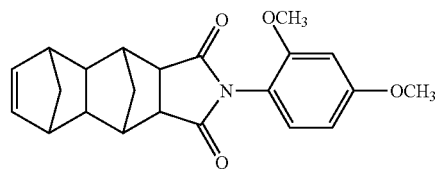

[Chemical formula 14]

Structural formula (B):

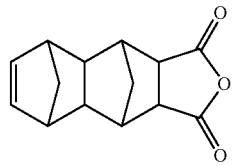

Example 1

A reaction vessel purged with nitrogen was charged with 7.90 g (21.6 mmol) of 6-(2,4-dimethoxyphenyl)-6-aza-pentacyclo[9.2.1.1$^{3,9}$.0$^{2,10}$.0$^{4,8}$]pentadec-12-ene-5,7-dione represented by the above structural formula (A) as Specific Monomer (I), 5.01 g (21.6 mmol) of 8-methyl-8-methoxycarbonyltetracyclo[4.4.0.1$^{2,5}$.1$^{7,10}$]dodec-3-ene represented by the following structural formula (C) as Specific Monomer (II), 0.27 g of 1-hexene as a molecular weight modifier and 51.5 g of toluene as a solvent, and the contents were heated to 80° C. To this system, were added 0.13 mL of a toluene solution (0.6 mol/L) of triethylaluminum and 0.34 mL of a toluene solution (0.025 mol/L) of methanol-modified tungsten hexachloride as catalysts, and a reaction was conducted at 80° C. for 4 hours, thereby obtaining a polymer solution containing a ring-opened norbornene polymer.

The ring-opened norbornene polymer thus obtained had a weight average molecular weight (Mw) of 14.2×10$^4$, a number average molecular weight (Mn) of 3.38×10$^4$ and a molecular weight distribution (Mw/Mn) of 4.20.

[Chemical formula 15]

Structural formula (C):

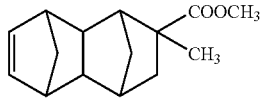

The resultant polymer solution was placed in an autoclave, and 300 g of toluene was further added. As a hydrogenation catalyst, RuHCl(CO)[P(C$_6$H$_5$)$_3$]$_3$ was then added in an amount of 2500 ppm to the charged amount of the monomers in the reaction system to conduct a hydrogenation reaction under conditions that a hydrogen gas pressure was 9 to 10 MPa, a reaction temperature was 160 to 165° C., and the reaction conditions were 4 hours. After completion of the reaction, the resultant reaction solution was poured into a great amount of methanol to precipitate a product, thereby obtaining a hydrogenated ring-opened norbornene polymer. This ring-opened norbornene polymer is referred to as "Polymer (P1)".

Polymer (P1) had a weight average molecular weight (Mw) of 14.9×10$^4$, a number average molecular weight (Mn) of 3.59×10$^4$, a molecular weight distribution (Mw/Mn) of 4.15, an intrinsic viscosity (ηinh) of 0.74 and a glass transition temperature (Tg) of 221.4° C.

A proportion of the structural unit (I) derived from 6-(2,4-dimethoxyphenyl)-6-aza-pentacyclo[9.2.1.1$^{3,9}$.0$^{2,10}$.0$^{4,8}$]pentadec-12-ene-5,7-dione in Polymer (P1) was 44 mol %, and a proportion of the structural unit (II) derived from 8-methyl-8-methoxycarbonyltetracyclo[4.4.0.1$^{2,5}$.1$^{7,10}$]-dodec-3-ene was 56 mol %.

Figure 2:
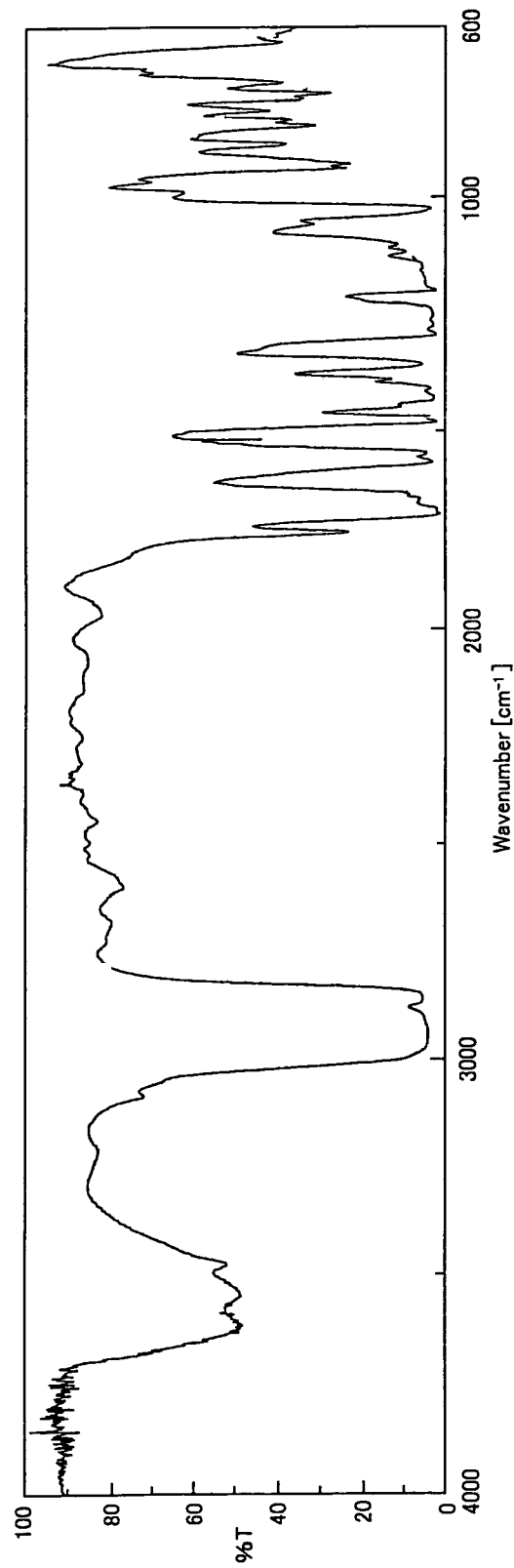
FIG. 2 illustrates an IR spectrum of Polymer (P1) according to Example 1.

As a result that Polymer (P1) was analyzed by $^1$H-NMR, it was found that the hydrogenation rate of the olefinic double bonds is at least 99%, and the remaining rate of the aromatic rings is substantially 100%. The $^1$H-NMR spectrum and IR spectrum of Polymer (P1) are illustrated in FIG. 1 and FIG. 2, respectively.

Example 2

A reaction vessel purged with nitrogen was charged with 5.00 g (15.0 mmol) of 6-(4-chloro-2-methylphenyl)-6-aza-pentacyclo[9.2.1.1$^{3,9}$.0$^{2,10}$.0$^{4,8}$]pentadec-12-ene-5,7-dione represented by the following structural formula (D) as Specific Monomer (I), 3.48 g (15.0 mmol) of 8-methyl-8-methoxycarbonyltetracyclo[4.4.0.1$^{2,5}$.1$^{7,10}$]dodec-3-ene represented by the above structural formula (C) as Specific Monomer (II), 0.19 g of 1-hexene as a molecular weight modifier and 66 g of toluene as a solvent, and the contents were heated to 100° C. To this system, were added 0.16 mL of a toluene solution (0.6 mol/L) of triethylaluminum and 0.44 mL of a toluene solution (0.025 mol/L) of methanol-modified tungsten hexachloride as catalysts, and a reaction was conducted at 80° C. for 4 hours, thereby obtaining a polymer solution containing a ring-opened norbornene polymer.

The ring-opened norbornene polymer thus obtained had a weight average molecular weight (Mw) of 10.7×10$^4$, a number average molecular weight (Mn) of 3.49×10$^4$ and a molecular weight distribution (Mw/Mn) of 3.07.

[Chemical formula 16]

Structural formula (D):

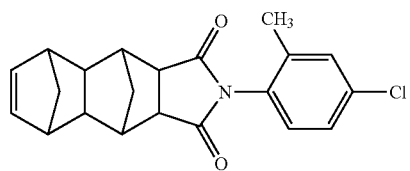

The resultant ring-opened norbornene polymer was subjected to a hydrogenation reaction in the same manner as in Example 1, thereby obtaining a hydrogenated ring-opened norbornene polymer. This ring-opened norbornene polymer is referred to as "Polymer (P2)".

Polymer (P2) had a weight average molecular weight (Mw) of 10.3×10$^4$, a number average molecular weight (Mn) of 3.50×10$^4$, a molecular weight distribution (Mw/Mn) of 2.94, an intrinsic viscosity (ηinh) of 0.58 and a glass transition temperature (Tg) of 215.0° C.

A proportion of the structural unit (I) derived from 6-(4-chloro-2-methylphenyl)-6-aza-pentacyclo[9.2.1.1$^{3,9}$.0$^{2,10}$.0$^{4,8}$]pentadec-12-ene-5,7-dione in Polymer (P2) was 37.2 mol %, and a proportion of the structural unit (II) derived from 8-methyl-8-methoxy-carbonyltetracyclo[4.4.0.1$^{2,5}$.1$^{7,10}$]-dodec-3-ene was 62.8 mol %.

Figure 3:
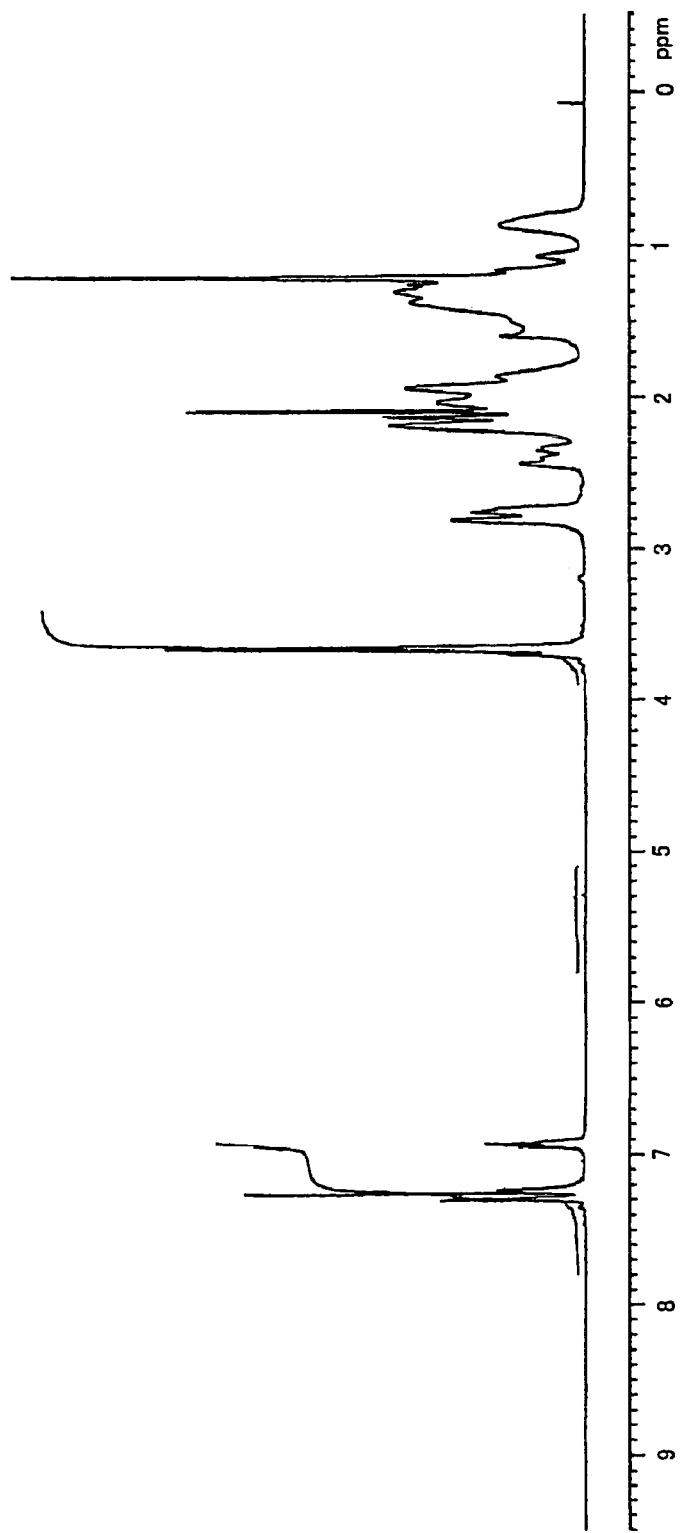
FIG. 3 illustrates a $^1$H-NMR spectrum of Polymer (P2) according to Example 2.
Figure 4:
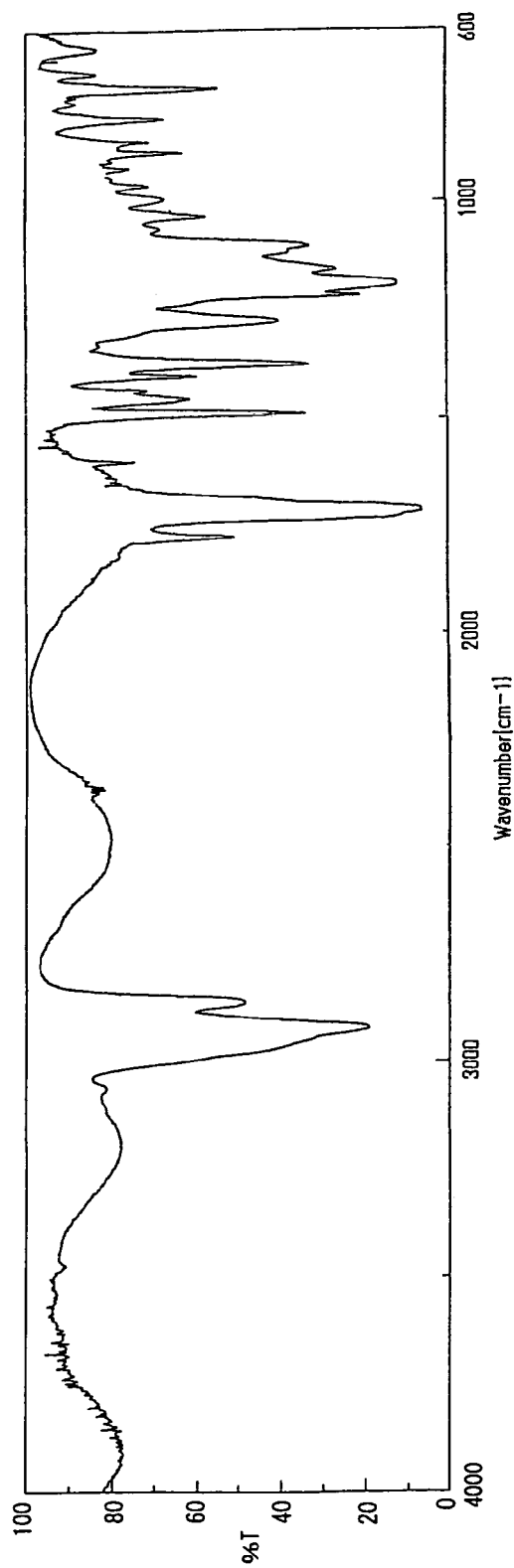
FIG. 4 illustrates an IR spectrum of Polymer (P2) according to Example 2.

As a result that Polymer (P2) was analyzed by $^1$H-NMR, it was found that the hydrogenation rate of the olefinic double bonds is at least 99%, and the remaining rate of the aromatic rings is substantially 100%. The $^1$H-NMR spectrum and IR spectrum of Polymer (P2) are illustrated in FIG. 3 and FIG. 4, respectively.

Example 3

A reaction vessel purged with nitrogen was charged with 5.00 g (14.1 mmol) of 6-(2,6-dimethylphenyl)-6-aza-pentacyclo[9.2.1.1$^{3,9}$.0$^{2,10}$.0$^{4,8}$]pentadec-12-ene-5,7-dione represented by the following structural formula (E) as Specific Monomer (I), 3.28 g (14.1 mmol) of 8-methyl-8-methoxy-carbonyltetracyclo[4.4.0.1$^{2,5}$.1$^{7,10}$]dodec-3-ene represented by the above structural formula (C) as Specific Monomer (II), 0.20 g of 1-hexene as a molecular weight modifier and 34 g of toluene as a solvent, and the contents were heated to 80° C. To this system, were added 0.07 mL of a toluene solution (0.6 mol/L) of triethylaluminum and 0.24 mL of a toluene solution (0.025 mol/L) of methanol-modified tungsten hexachloride as catalysts, and a reaction was conducted at 80° C. for 0.5 hours, thereby obtaining a polymer solution containing a ring-opened norbornene polymer.

The ring-opened norbornene polymer thus obtained had a weight average molecular weight (Mw) of 26.3×10$^4$, a number average molecular weight (Mn) of 3.35×10$^4$ and a molecular weight distribution (Mw/Mn) of 7.86.

Structural formula (E):

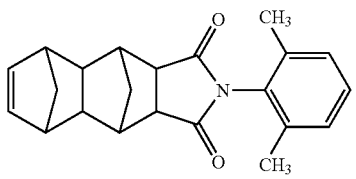

[Chemical formula 17]

The resultant ring-opened norbornene polymer was subjected to a hydrogenation reaction in the same manner as in Example 1, thereby obtaining a hydrogenated ring-opened norbornene polymer. This ring-opened norbornene polymer is referred to as "Polymer (P3)".

Polymer (P3) had a weight average molecular weight (Mw) of $26.0 \times 10^4$, a number average molecular weight (Mn) of $4.50 \times 10^4$, a molecular weight distribution (Mw/Mn) of 5.78, an intrinsic viscosity (ηinh) of 1.12 and a glass transition temperature (Tg) of 205.1° C.

A proportion of the structural unit (I) derived from 6-(2,6-dimethylphenyl)-6-aza-pentacyclo[9.2.1.1$^{3,9}$.0$^{2,10}$.0$^{4,8}$]pentadec-12-ene-5,7-dione in Polymer (P3) was 34.7 mol %, and a proportion of the structural unit (II) derived from 8-methyl-8-methoxycarbonyltetracyclo[4.4.0.1$^{2,5}$.1$^{7,10}$]dodec-3-ene was 65.3 mol %.

Figure 5:
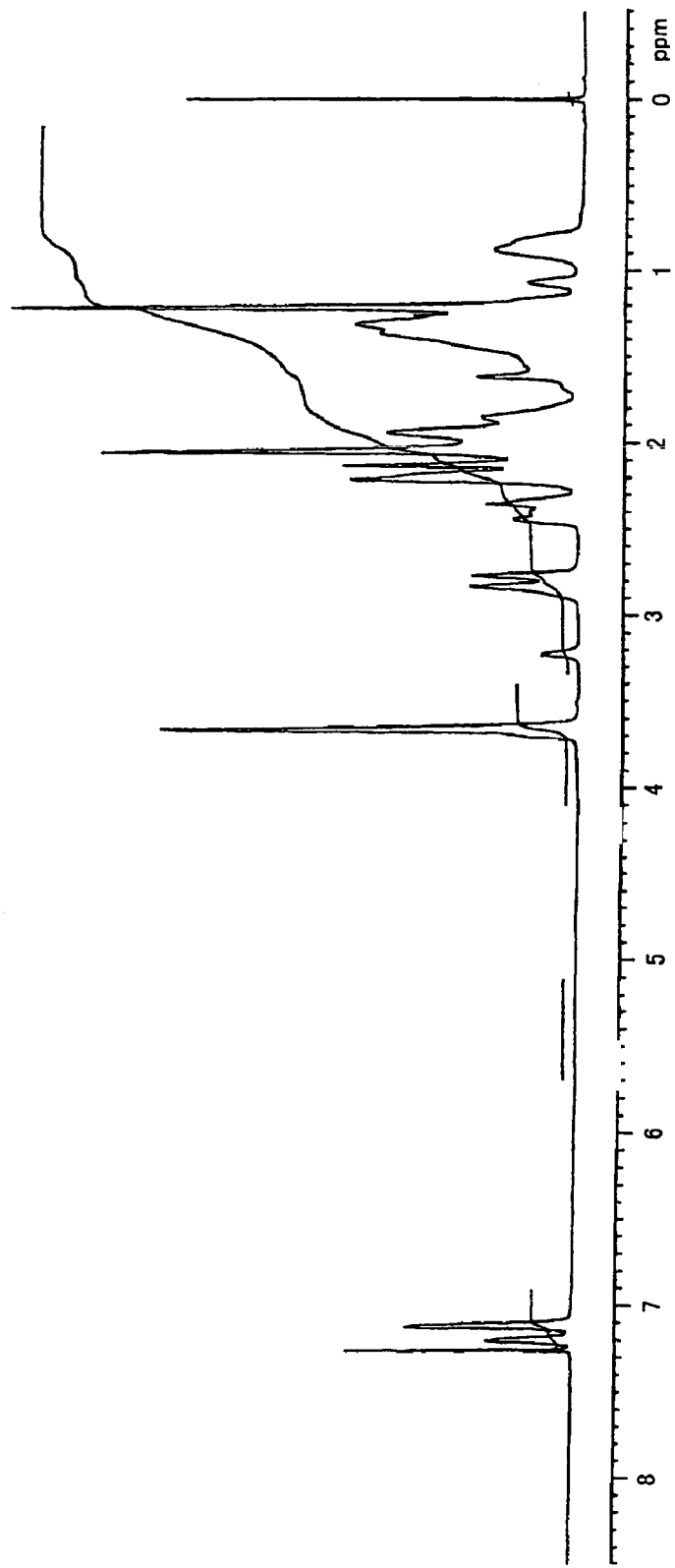
FIG. 5 illustrates a $^1$H-NMR spectrum of Polymer (P3) according to Example 3.
Figure 6:
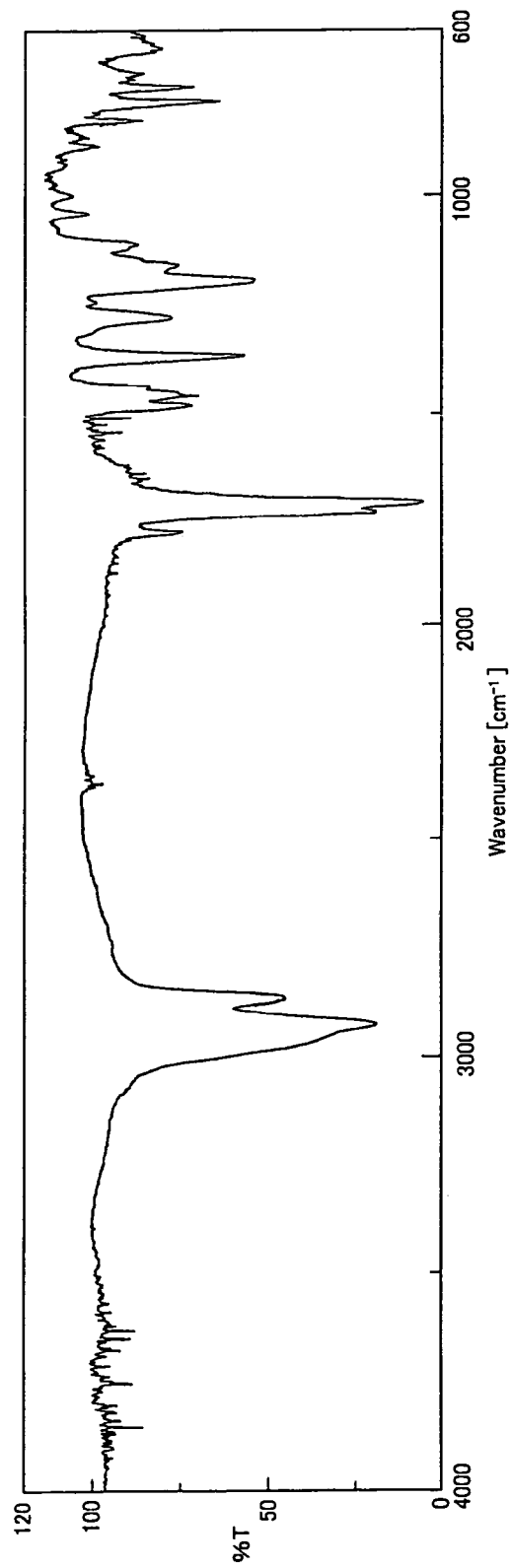
FIG. 6 illustrates an IR spectrum of Polymer (P3) according to Example 3.

As a result that Polymer (P3) was analyzed by $^1$H-NMR, it was found that the hydrogenation rate of the olefinic double bonds is at least 99%, and the remaining rate of the aromatic rings is substantially 100%. The $^1$H-NMR spectrum and IR spectrum of Polymer (P3) are illustrated in FIG. 5 and FIG. 6, respectively.

Example 4

A reaction vessel purged with nitrogen was charged with 5.00 g (12.1 mmol) of 6-(4-bromo-2,6-dimethylphenyl)-6-aza-pentacyclo[9.2.1.1$^{3,9}$.0$^{2,10}$.0$^{4,8}$]pentadec-12-ene-5,7-dione represented by the following structural formula (F) as Specific Monomer (I), 2.80 g (12.1 mmol) of 8-methyl-8-methoxycarbonyltetracyclo[4.4.0.1$^{2,5}$.1$^{7,10}$]dodec-3-ene represented by the above structural formula (C) as Specific Monomer (II), 0.15 g of 1-hexene as a molecular weight modifier and 31.2 g of toluene as a solvent, and the contents were heated to 80° C. To this system, were added 0.12 mL of a toluene solution (0.6 mol/L) of triethylaluminum and 0.39 mL of a toluene solution (0.025 mol/L) of methanol-modified tungsten hexachloride as catalysts, and a reaction was conducted at 80° C. for 3 hours, thereby obtaining a polymer solution containing a ring-opened norbornene polymer.

The ring-opened norbornene polymer thus obtained had a weight average molecular weight (Mw) of $11.2 \times 10^4$, a number average molecular weight (Mn) of $5.77 \times 10^4$ and a molecular weight distribution (Mw/Mn) of 1.94.

Structural formula (F):

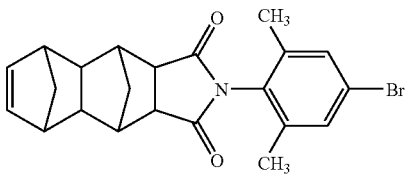

[Chemical formula 18]

The resultant ring-opened norbornene polymer was subjected to a hydrogenation reaction in the same manner as in Example 1, thereby obtaining a hydrogenated ring-opened norbornene polymer. This ring-opened norbornene polymer is referred to as "Polymer (P4)".

Polymer (P4) had a weight average molecular weight (Mw) of $10.1 \times 10^4$, a number average molecular weight (Mn) of $4.41 \times 10^4$, a molecular weight distribution (Mw/Mn) of 2.29, an intrinsic viscosity (ηinh) of 0.56 and a glass transition temperature (Tg) of 225.3° C.

A proportion of the structural unit (I) derived from 6-(4-bromo-2,6-dimethylphenyl)-6-aza-pentacyclo[9.2.1.1$^{3,9}$.0$^{2,10}$.0$^{4,8}$]pentadec-12-ene-5,7-dione in Polymer (P4) was 36.6 mol %, and a proportion of the structural unit (II) derived from 8-methyl-8-methoxy-carbonyltetracyclo[4.4.0.1$^{2,5}$.1$^{7,10}$]-dodec-3-ene was 63.4 mol %.

Figure 7:
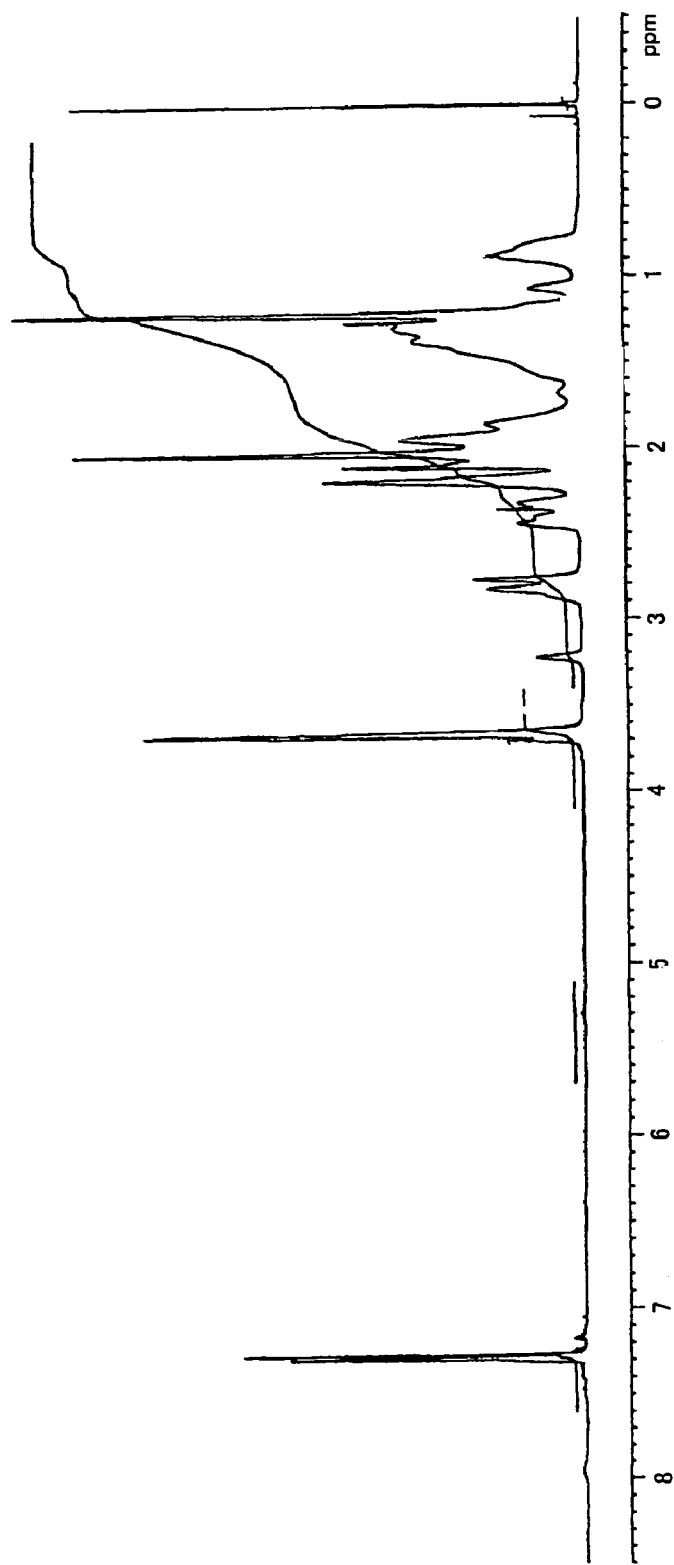
FIG. 7 illustrates a $^1$H-NMR spectrum of Polymer (P4) according to Example 4.
Figure 8:
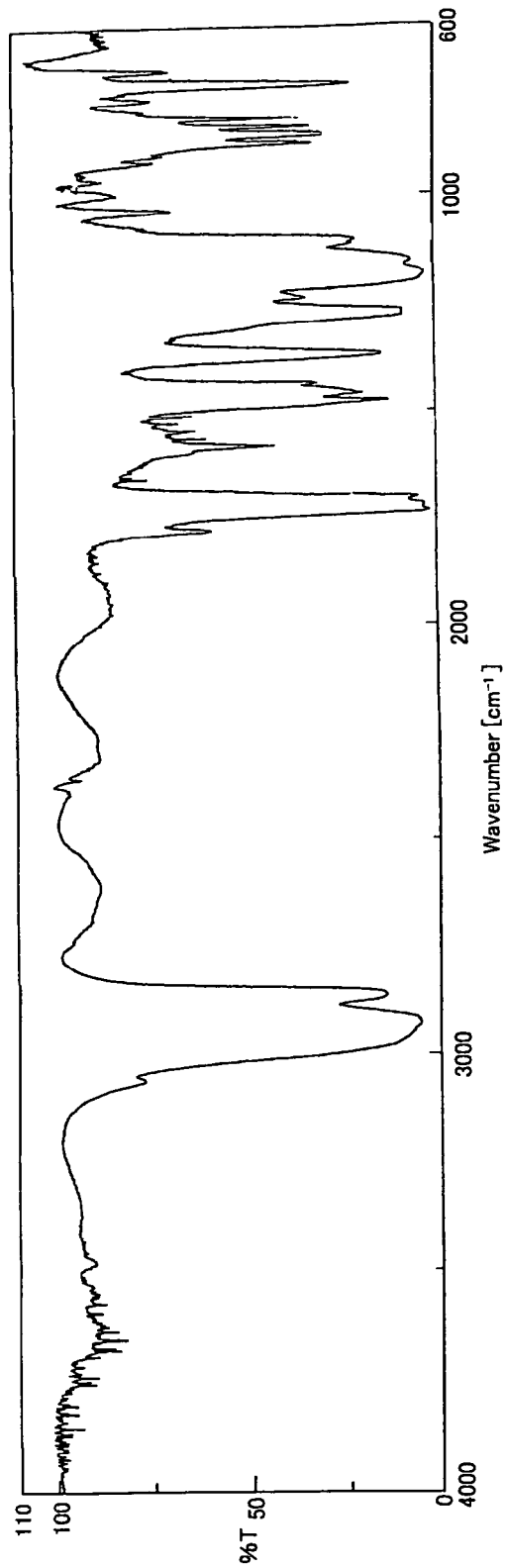
FIG. 8 illustrates an IR spectrum of Polymer (P4) according to Example 4.

As a result that Polymer (P4) was analyzed by $^1$H-NMR, it was found that the hydrogenation rate of the olefinic double bonds is at least 99%, and the remaining rate of the aromatic rings is substantially 100%. The $^1$H-NMR spectrum and IR spectrum of Polymer (P4) are illustrated in FIG. 7 and FIG. 8, respectively.

Example 5

A reaction vessel purged with nitrogen was charged with 8.62 g (21.6 mmol) of 6-(4-chloro-2,5-dimethoxphenyl)-6-aza-pentacyclo[9.2.1.1$^{3,9}$.0$^{2,10}$.0$^{4,8}$]pentadec-12-ene-5,7-dione represented by the following structural formula (G) as Specific Monomer (I), 5.00 g (21.6 mmol) of 8-methyl-8-methoxycarbonyltetracyclo[4.4.0.1$^{2,5}$.1$^{7,10}$]dodec-3-ene represented by the above structural formula (C) as Specific Monomer (II), 0.27 g of 1-hexene as a molecular weight modifier and 31.3 g of toluene as a solvent, and the contents were heated to 80° C. To this system, were added 0.11 mL of a toluene solution (0.6 mol/L) of triethylaluminum and 0.35 mL of a toluene solution (0.025 mol/L) of methanol-modified tungsten hexachloride as a catalysts, and a reaction was conducted at 80° C. for 4 hours, thereby obtaining a polymer solution containing a ring-opened norbornene polymer.

The ring-opened norbornene polymer thus obtained had a weight average molecular weight (Mw) of $15.8 \times 10^4$, a number average molecular weight (Mn) of $3.35 \times 10^4$ and a molecular weight distribution (Mw/Mn) of 4.73.

Structural formula (G):

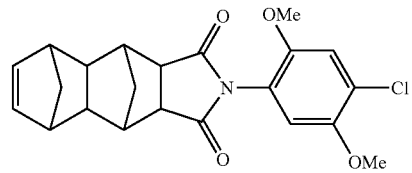

[Chemical formula 19]

The resultant ring-opened norbornene polymer was subjected to a hydrogenation reaction in the same manner as in Example 1, thereby obtaining a hydrogenated ring-opened norbornene polymer. This ring-opened norbornene polymer is referred to as "Polymer (P5)".

Polymer (P5) had a weight average molecular weight (Mw) of $11.8 \times 10^4$, a number average molecular weight (Mn) of $3.69 \times 10^4$, a molecular weight distribution (Mw/Mn) of 3.18, an intrinsic viscosity (ηinh) of 0.50 and a glass transition temperature (Tg) of 215.0° C.

A proportion of the structural unit (I) derived from 6-(4-chloro-2,5-dimethoxyphenyl)-6-aza-pentacyclo [$9.2.1.1^{3,9}.0^{2,10}.0^{4,8}$]pentadec-12-ene-5,7-dione in Polymer (P5) was 41.6 mol %, and a proportion of the structural unit (II) derived from 8-methyl-8-methoxycarbonyltetracyclo-[$4.4.0.1^{2,5}.1^{7,10}$]dodec-3-ene was 58.4 mol %.

Figure 9:
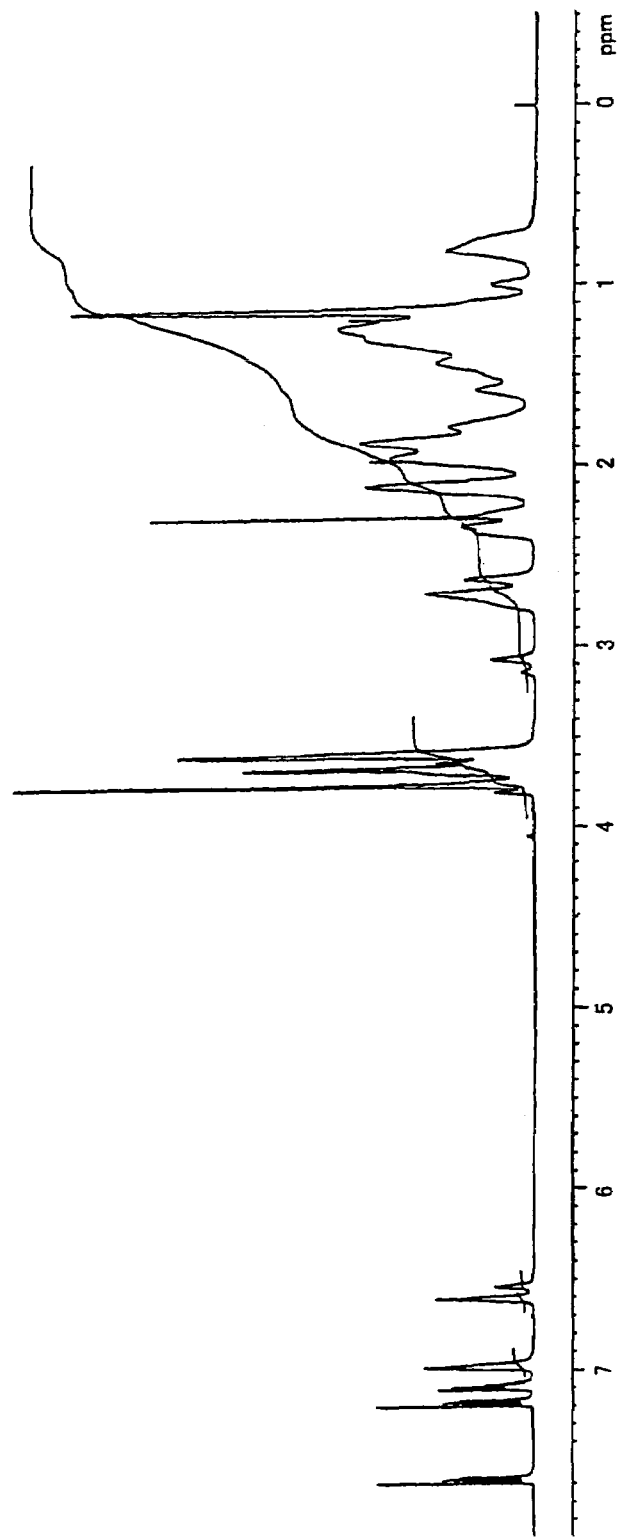
FIG. 9 illustrates a $^1$H-NMR spectrum of Polymer (P5) according to Example 5.
Figure 10:
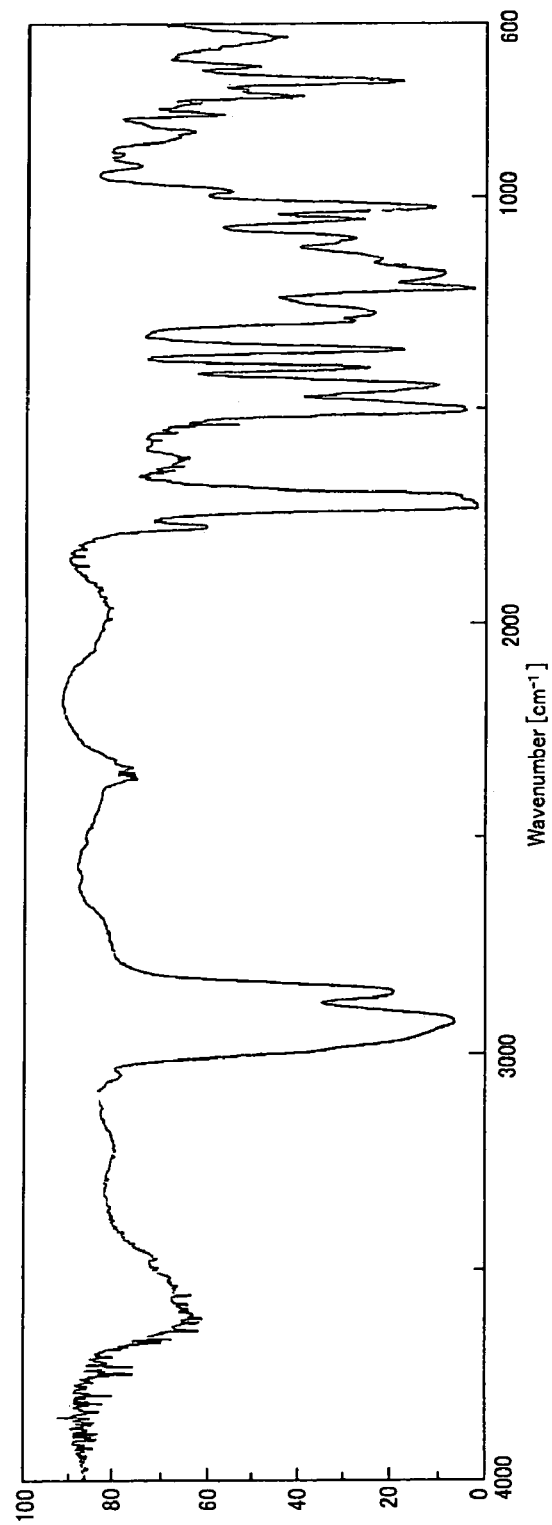
FIG. 10 illustrates an IR spectrum of Polymer (P5) according to Example 5.

As a result that Polymer (P5) was analyzed by $^1$H-NMR, it was found that the hydrogenation rate of the olefinic double bonds is at least 99%, and the remaining rate of the aromatic rings is substantially 100%. The $^1$H-NMR spectrum and IR spectrum of Polymer (P5) are illustrated in FIG. 9 and FIG. 10, respectively.

Example 6

A reaction vessel purged with nitrogen was charged with 5.00 g (12.1 mmol) of 6-(2-methyl-5-methoxycarbonylphenyl)-6-aza-pentacyclo[$9.2.1.1^{3,9}.0^{2,10}.0^{4,8}$]pentadec-12-ene-5,7-dione represented by the following structural formula (H) as Specific Monomer (I), 8.13 g (12.1 mmol) of 8-methyl-8-methoxycarbonyltetracyclo-[$4.4.0.1^{2,5}.1^{7,10}$]dodec-3-ene represented by the above structural formula (II) as Specific Monomer (II), 0.27 g of 1-hexene as a molecular weight modifier and 120.8 g of toluene as a solvent, and the contents were heated to 80° C. To this system, were added 0.11 mL of a toluene solution (0.6 mol/L) of triethylaluminum and 0.34 mL of a toluene solution (0.025 mol/L) of methanol-modified tungsten hexachloride as catalysts, and a reaction was conducted at 80° C. for 4 hours, thereby obtaining a polymer solution containing a ring-opened norbornene polymer.

The ring-opened norbornene polymer thus obtained had a weight average molecular weight (Mw) of $20.0 \times 10^4$, a number average molecular weight (Mn) of $2.31 \times 10^4$ and a molecular weight distribution (Mw/Mn) of 8.66.

[Chemical formula 20]

Structural formula (H):

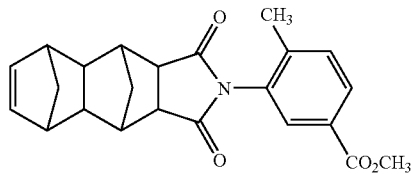

The resultant ring-opened norbornene polymer was subjected to a hydrogenation reaction in the same manner as in Example 1, thereby obtaining a hydrogenated ring-opened norbornene polymer. This ring-opened norbornene polymer is referred to as "Polymer (P6)".

Polymer (P6) had a weight average molecular weight (Mw) of $26.5 \times 10^4$, a number average molecular weight (Mn) of $4.21 \times 10^4$, a molecular weight distribution (Mw/Mn) of 6.30, an intrinsic viscosity (ηinh) of 0.97 and a glass transition temperature (Tg) of 211.6° C.

A proportion of the structural unit (I) derived from 6-(2-methyl-5-methoxycarbonylphenyl)-6-aza-pentacyclo- [$9.2.1.1^{3,9}.0^{2,10}.0^{4,8}$]pentadec-12-ene-5,7-dione in Polymer (P6) was 44.1 mol %, and a proportion of the structural unit (II) derived from 8-methyl-8-methoxycarbonyltetracyclo- [$4.4.0.1^{2,5}.1^{7,10}$]dodec-3-ene was 55.9 mol %.

Figure 11:
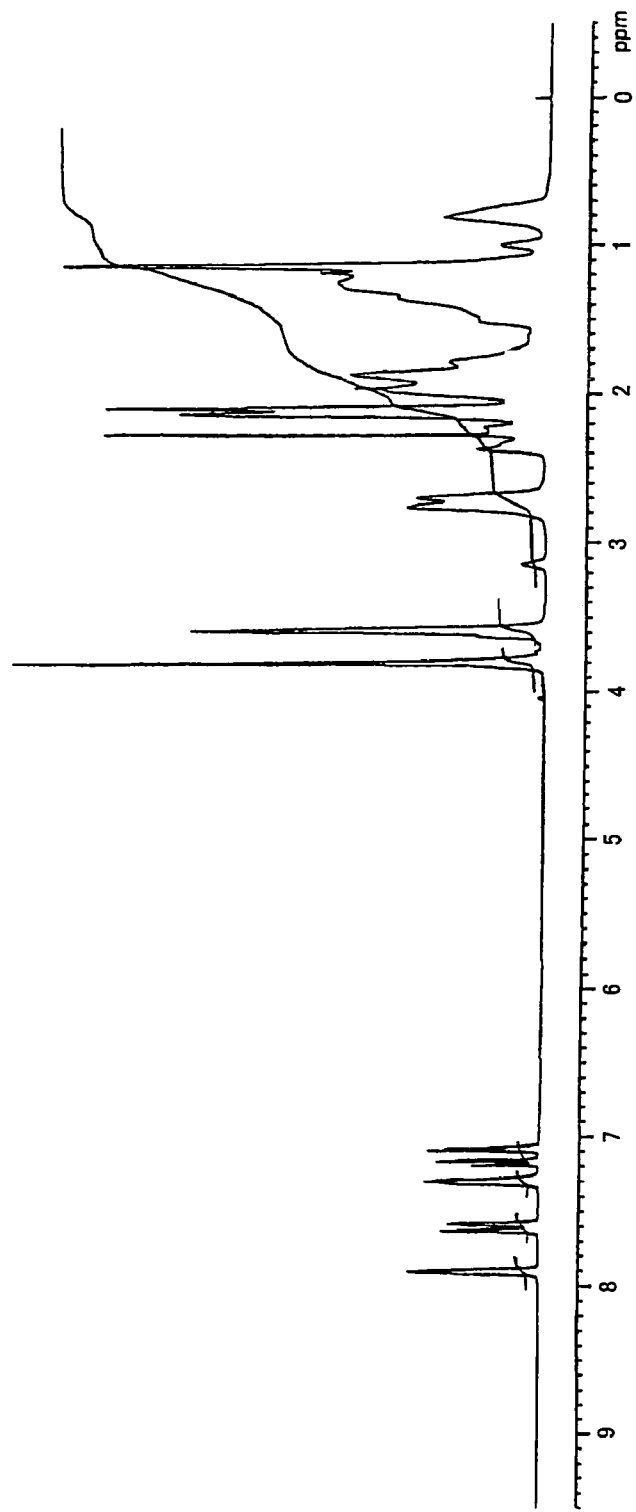
FIG. 11 illustrates a $^1$H-NMR spectrum of Polymer (P6) according to Example 6.
Figure 12:
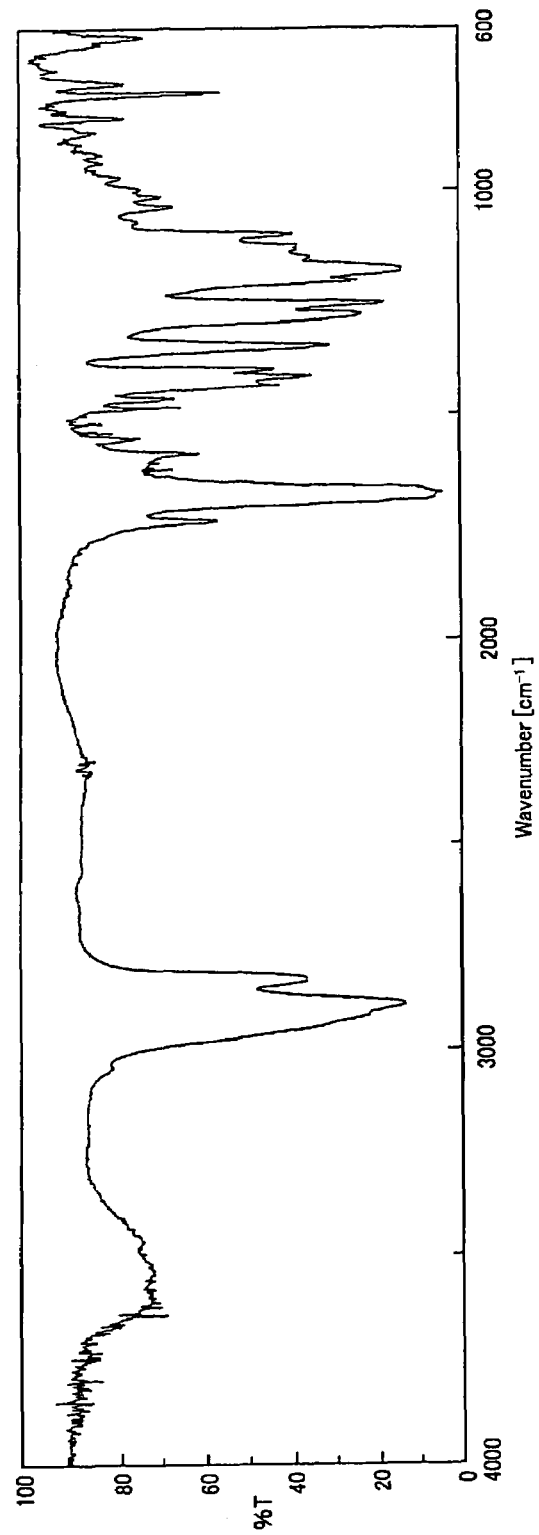
FIG. 12 illustrates an IR spectrum of Polymer (P6) according to Example 6.

As a result that Polymer (P6) was analyzed by $^1$H-NMR, it was found that the hydrogenation rate of the olefinic double bonds is at least 99%, and the remaining rate of the aromatic rings is substantially 100%. The $^1$H-NMR spectrum and IR spectrum of Polymer (P6) are illustrated in FIG. 11 and FIG. 12, respectively.

Comparative Example 1

A reaction vessel purged with nitrogen was charged with 50 g of 8-methyl-8-methoxycarbonyltetracyclo-[$4.4.0.1^{2,5}.1^{7,10}$]dodec-3-ene represented by the above structural formula (C) as a monomer, 3.6 g of 1-hexene as a molecular weight modifier and 100 g of toluene as a solvent, and the contents were heated to 80° C. To this system, were added 0.09 mL of a toluene solution (0.6 mol/L) of triethylaluminum and 0.29 mL of a toluene solution (0.025 mol/L) of methanol-modified tungsten hexachloride as catalysts, and a reaction was conducted at 80° C. for 3 hours, thereby obtaining a polymer solution containing a ring-opened norbornene polymer.

The resultant ring-opened norbornene polymer was subjected to a hydrogenation reaction in the same manner as in Example 1, thereby obtaining a hydrogenated ring-opened norbornene polymer. This ring-opened norbornene polymer is referred to as "Polymer (P7)".

Polymer (P7) had a weight average molecular weight (Mw) of $5.6 \times 10^4$, a number average molecular weight (Mn) of $1.75 \times 10^4$, a molecular weight distribution (Mw/Mn) of 3.2 and a glass transition temperature (Tg) of 167° C.

As a result that Polymer (P7) was analyzed by $^1$H-NMR, it was found that the hydrogenation rate of the olefinic double bonds is at least 99%.

<Evaluation>

Polymer (P1) to Polymer (P7) obtained in Examples 1 to 6 and Comparative Example 1 were separately dissolved in toluene or methylene chloride, thereby preparing solutions for solvent casting. Each of these solutions was placed on a glass plate and subjected to a drying treatment, thereby producing a colorless and transparent film having a thickness of 200 μm and a residual solvent of 0.5 to 0.8%.

The films thus obtained were respectively uniaxially stretched at their corresponding stretching ratios shown in the following Table 1, thereby producing stretched films. The stretching temperature was Tg+10° C., in which Tg was a glass transition temperature of the polymer forming the film. The birefringence Δn ($\Delta n = n_x - n_y$; $n_x$: refractive index in a stretching direction; $n_y$: refractive index in a direction perpendicular to the stretching direction) of each of the resultant films was measured by means of an automatic birefringence analyzer "KOBRA21DH" manufactured by Oji Scientific Instruments. Birefringence values at a measuring wavelength of 550 nm are shown in Table 1.

TABLE 1

| | Glass transition temperature (° C.) | Stretching ratio (times) | Birefringence Δn (550 nm) |
|---|---|---|---|
| Example 1 | 221.4 | 1.7 | $5.0 \times 10^{-4}$ |
| Example 2 | 215.0 | 1.7 | $12.0 \times 10^{-4}$ |
| Example 3 | 205.1 | 1.4 | $6.4 \times 10^{-4}$ |
| Example 4 | 225.3 | 2.0 | $-0.3 \times 10^{-4}$ |
| Example 5 | 215.0 | 1.7 | $5.5 \times 10^{-4}$ |
| Example 6 | 211.6 | 1.7 | $9.3 \times 10^{-4}$ |
| Comparative Example 1 | 167.0 | 1.7 | $31.4 \times 10^{-4}$ |

As apparent from Table 1, it was confirmed that the stretched films formed respectively of Polymers (P1) to (P6)

according to Examples 1 to 6 are all lower in birefringence than the stretched film formed of Polymer (P7) according to Comparative Example 1. In particular, the stretched film formed of Polymer (P4) according to Example 4 scarcely exhibited birefringence.

With respect to the stretched film formed of Polymer (P1) according to Example 1 and the stretched film formed of Polymer (P7) according to Comparative Example 1, retardation (Re=Δn×d; d: thickness of the film) was measured by means of the automatic birefringence analyzer "KOBRA21DH" manufactured by Oji Scientific Instruments to find values of a ratio Re/Re550 of retardation Re at respective wavelengths to retardation Re550 at a wavelength of 550 nm. The result is shown in FIG. 13.

Figure 13:
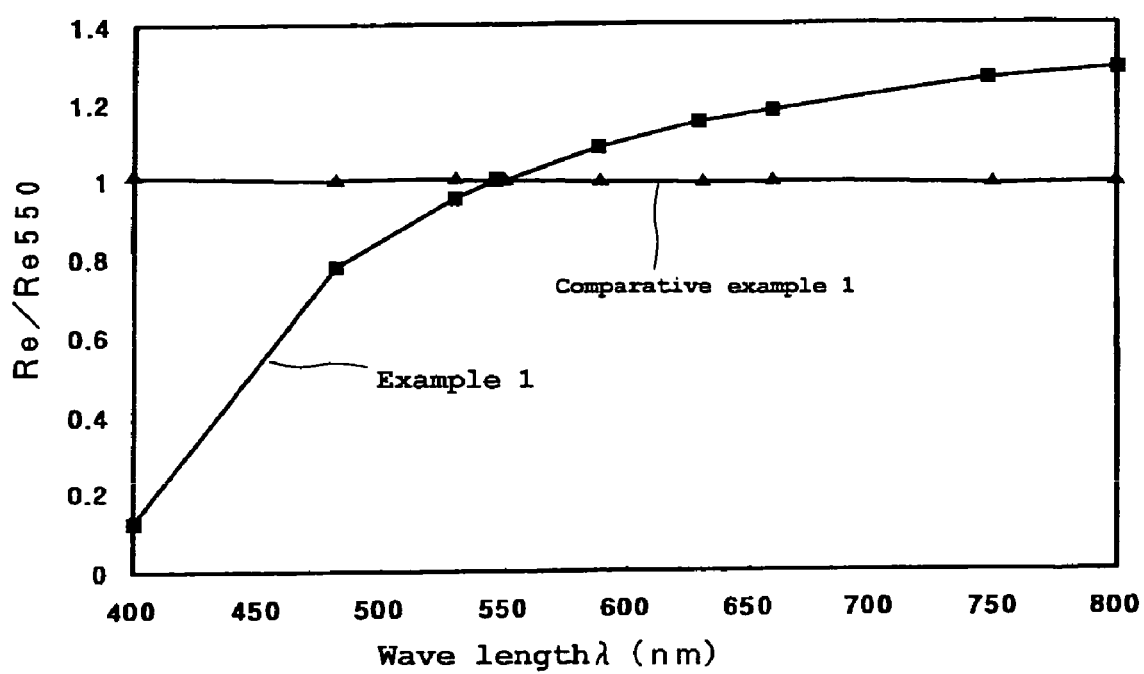
FIG. 13 diagrammatically illustrates the wavelength dependency about birefringence in stretched films formed of polymers according to Example 1 and Comparative Example 1.

As apparent from FIG. 13, it was confirmed that the value of the ratio Re/Re550 of the stretched film formed of Polymer (P1) according to Example 1 becomes greater as the wavelength of transmitted light becomes longer, and so the dependence of birefringence on wavelength is high and specific.

On the other hand, the value of the ratio Re/Re550 of the stretched film formed of Polymer (P7) according to Comparative Example 1 was almost constant irrespective of the wavelength of transmitted light.

The invention claimed is:

1. A ring-opened polynorbornene comprising a structural unit (I) represented by the following general formula (I):

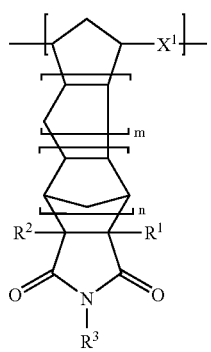

General formula (I)

wherein in the general formula (I), m is 0 and n is 1, $X^1$ means an ethylene or vinylene group, $R^1$ and $R^2$ denote, independently of each other, a hydrogen atom or a substituted or unsubstituted hydrocarbon group having 1 to 30 carbon atoms, and $R^3$ represents a group represented by the following general formula (I-1) or a group represented by the following general formula (I-2):

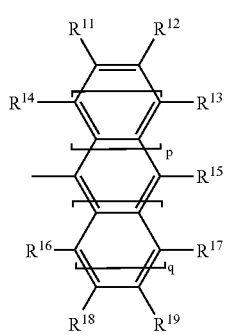

General Formula (I-1)

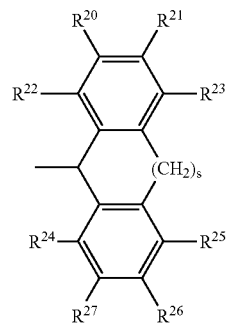

General Formula (I-2)

wherein in the general formulae (I-1) and (I-2), $R^{11}$ to $R^{27}$ denote, independently of one another, a hydrogen atom; a halogen atom; a substituted or unsubstituted hydrocarbon group having 1 to 30 carbon atoms, which may have a linkage containing or not containing oxygen, sulfur, nitrogen and/or silicon atom(s); or a polar group, p and q in the general formula (I-1) are individually 0, $R^{12}$ and $R^{15}$, or $R^{19}$ and $R^{15}$ may be bonded to each other to form a carbon ring or heterocyclic ring, and the carbon ring or heterocyclic ring may be either a monocyclic structure or a polycyclic structure, and at least one of $R^{11}$ and $R^{18}$ is another substituent group other than hydrogen, and s in the general formula (I-2) is 0 or an integer of 1 or greater.

2. The ring-opened polynorbornene according to claim 1, which comprises a structural unit (II) represented by the following general formula (II):

[Chemical formula 3]

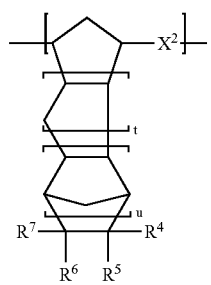

General Formula (II)

wherein in the general formula (II), t and u are, independently of each other, 0 or a positive integer, $X^2$ means an ethylene or vinylene group, $R^4$ to $R^7$ denote, independently of one another, a hydrogen atom; a halogen atom; a substituted or unsubstituted hydrocarbon group having 1 to 30 carbon atoms, which may have a linkage containing or not containing oxygen, sulfur, nitrogen and/or silicon atom(s); or a polar group, with the proviso that $R^4$ and $R^5$, or $R^6$ and $R^7$ may be united with each other to form a divalent hydrocarbon group, $R^4$ or $R^5$, and $R^6$ or $R^7$ may be bonded to each other to form a carbon ring or heterocyclic ring, and the carbon ring or heterocyclic ring may be either a monocyclic structure or a polycyclic structure.

3. The ring-opened polynorbornene according to claim 2, wherein the proportion of the structural unit (II) is at most 98 mol % based on the whole structural unit.

4. The ring-opened polynorbornene according to claim 2, wherein at least 90 mol % of $X^1$ in the general formula (I) and $X^2$ in the general formula (II) are ethylene groups.

5. The ring-opened polynorbornene according to claim 1, at least one of $R^{12}$, $R^{15}$ and $R^{19}$ is another substituent group than hydrogen.

6. The ring-opened polynorbornene according to claim 1, both $R^{11}$ and $R^{18}$ are other substituent groups than hydrogen.

7. A process for producing a hydrogenated ring-opened polynorbornene as claimed in claim 1, which comprises:
   a step of ring-opening reaction of a precursor monomer for said ring-opened polynorbornene, and
   a step of hydrogenation of the product of the former step wherein the hydrogenation rate of the vinylene groups is at least 90%.

8. The process according to claim 7, wherein said ring-opened polynorbornene comprises a structural unit (II) represented by the following general formula (II)

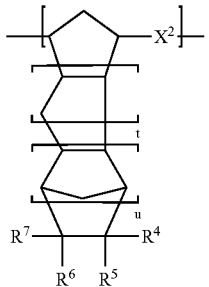

General Formula (II)

wherein in the general formula (II), t and u are, independently of each other, 0 or a positive integer, $X^2$ means an ethylene or vinylene group, $R^4$ to $R^7$ denote, independently of one another, a hydrogen atom; a halogen atom; a substituted or unsubstituted hydrocarbon group having 1 to 30 carbon atoms, which may have a linkage containing or not containing oxygen, sulfur, nitrogen and/or silicon atom(s); or a polar group, with the proviso that $R^4$ and $R^5$, or $R^6$ and $R^7$ may be united with each other to form a divalent hydrocarbon group, $R^4$ or $R^5$, and $R^6$ or $R^7$ may be bonded to each other to form a carbon ring or heterocyclic ring, and the carbon ring or heterocyclic ring may be either a monocyclic structure or a polycyclic structure.

9. The process according to claim 8, wherein the proportion of the structural unit (II) is at most 98 mol % based on the whole structural unit.

10. The process according to claim 8, wherein at least 90 mol % of $X^1$ in the general formula (I) and $X^2$ in the general formula (II) are ethylene groups.

11. The process according to claim 7, in which at least one of $R^{12}$, $R^{15}$ and $R^{19}$ is another substituent group than hydrogen.

12. The process according to claim 7, in which both $R^{11}$ and $R^{18}$ are other substituent groups than hydrogen.

* * * * *